(12) United States Patent
Brock et al.

(10) Patent No.: US 10,540,639 B2
(45) Date of Patent: *Jan. 21, 2020

(54) CRYPTOCURRENCY PAYMENT NETWORK

(71) Applicant: Square, Inc., San Francisco, CA (US)

(72) Inventors: Christopher Michael Brock, Berkeley, CA (US); Brian Grassadonia, San Francisco, CA (US); Michael Moring, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,160

(22) Filed: Sep. 14, 2018

(65) Prior Publication Data

US 2019/0034889 A1 Jan. 31, 2019

Related U.S. Application Data

(63) Continuation of application No. 16/011,556, filed on Jun. 18, 2018, which is a continuation of application
(Continued)

(51) Int. Cl.
*G06Q 40/00* (2012.01)
*G06Q 20/06* (2012.01)
(Continued)

(52) U.S. Cl.
CPC ........... *G06Q 20/065* (2013.01); *G06Q 20/06* (2013.01); *G06Q 20/20* (2013.01); *G06Q 20/36* (2013.01);
(Continued)

(58) Field of Classification Search
CPC ........ G06Q 4/00; G06Q 20/10; G06Q 20/102; G06Q 20/40; G06Q 20/065; G06Q 20/20;
(Continued)

(56) References Cited

U.S. PATENT DOCUMENTS

| 1,010,893 A | 12/1911 | Goddard |
| 10,055,715 B1 | 8/2018 | Grassadonia et al. |
| (Continued) | | |

FOREIGN PATENT DOCUMENTS

| EP | 2 953 076 A1 | 12/2015 |
| WO | 2019/023168 A1 | 1/2019 |

OTHER PUBLICATIONS

Eskandari S., et al., "Buy Your Coffee with Bitcoin: Real-World Deployment of a Bitcoin Point of Sale Terminal," A 2016 Intl IEEE Conferences on Ubiquitous Intelligence & Computing, Advanced and Trusted Computing, Scalable Computing and Communications, Cloud and Big Data Computing, Internet of People, and Smart World Congress (UIC/ATC/SCALCOM/CBDCOM/IOP/SMARTWORL, pp. 382-389 (Jul. 18, 2016).

(Continued)

*Primary Examiner* — Lalita M Hamilton
(74) *Attorney, Agent, or Firm* — Baker Botts L.L.P.

(57) ABSTRACT

In one embodiment, a method includes receiving a request for payment associated with a transaction between a first user and a second user, where the request specifies a payment amount in a fiat currency and identifying an indication that the first user intends to satisfy the request for payment using a non-fiat instrument. The method also includes initiating a first transfer of a value corresponding to the payment amount in the non-fiat instrument from a first balance of the first user to one or more service balances of a payment service and initiating a second transfer of a value corresponding to the payment amount in the fiat currency from the one or more service balances of the payment service to a second balance of the second user.

18 Claims, 16 Drawing Sheets

Related U.S. Application Data

No. 15/713,322, filed on Sep. 22, 2017, now Pat. No. 10,055,715.

(60) Provisional application No. 62/537,395, filed on Jul. 26, 2017.

(51) Int. Cl.
  *G06Q 20/40* (2012.01)
  *G06Q 20/36* (2012.01)
  *G06Q 20/20* (2012.01)
  *G06Q 20/38* (2012.01)

(52) U.S. Cl.
  CPC ....... *G06Q 20/3674* (2013.01); *G06Q 20/381* (2013.01); *G06Q 20/4012* (2013.01)

(58) Field of Classification Search
  CPC . G06Q 20/3674; G06Q 20/4014; G06Q 40/00
  See application file for complete search history.

(56) References Cited

U.S. PATENT DOCUMENTS

| | | | |
|---|---|---|---|
| 10,163,079 B1 | 12/2018 | Brock et al. | |
| 2013/0282580 A1 | 10/2013 | O'Brien et al. | |
| 2015/0033256 A1 | 1/2015 | Patel et al. | |
| 2015/0170112 A1* | 6/2015 | DeCastro | G06Q 20/381 705/39 |
| 2015/0262173 A1 | 9/2015 | Durbin et al. | |
| 2015/0324764 A1* | 11/2015 | Van Rooyen | G06Q 20/3276 705/69 |
| 2015/0332256 A1* | 11/2015 | Minor | G06Q 20/3678 705/69 |
| 2016/0148198 A1 | 5/2016 | Kelley | |
| 2016/0342976 A1* | 11/2016 | Davis | G06Q 20/3829 |
| 2016/0342978 A1* | 11/2016 | Davis | G06Q 20/02 |
| 2016/0342985 A1* | 11/2016 | Thomas | G06Q 20/401 |
| 2016/0342987 A1* | 11/2016 | Thomas | G06Q 20/401 |
| 2016/0342994 A1* | 11/2016 | Davis | G06Q 20/027 |
| 2016/0371771 A1* | 12/2016 | Serrano | H04L 67/12 |
| 2017/0011460 A1 | 1/2017 | Molinari et al. | |
| 2017/0061396 A1* | 3/2017 | Melika | G06Q 20/065 |
| 2017/0091756 A1 | 3/2017 | Stern et al. | |
| 2017/0140371 A1 | 5/2017 | Forzley et al. | |
| 2017/0206523 A1* | 7/2017 | Goeringer | G06F 21/45 |
| 2017/0213287 A1* | 7/2017 | Bruno | G06Q 40/04 |
| 2017/0293898 A1* | 10/2017 | Rampton | G06Q 20/065 |
| 2017/0330250 A1* | 11/2017 | Arjomand | G06Q 20/065 |
| 2017/0331828 A1 | 11/2017 | Caldera et al. | |
| 2017/0337534 A1* | 11/2017 | Goeringer | G06Q 20/02 |
| 2017/0352012 A1* | 12/2017 | Hearn | G06Q 20/065 |
| 2017/0352027 A1* | 12/2017 | Zhang | H04L 9/0825 |
| 2017/0353309 A1* | 12/2017 | Gray | G06F 21/53 |
| 2019/0034888 A1 | 1/2019 | Grassadonia et al. | |

OTHER PUBLICATIONS

Zuberi, et al., "Schumpeter's revenge: the gale of creative destruction: digital currencies and blockchain technology," Banking & Financial Services Policy Report 35.5: 1(8), Aspen Publishers, Inc. (May 2016).

Quibria, N., "Blockchain Holds Promise for Cross-Border Payments," American Banker, SourceMedia, Inc., vol. 1, Issue 122, pp. 1-4 (Aug. 10, 2015).

Non-Final Office Action dated Dec. 28, 2017, for U.S. Appl. No. 15/713,322, of Grassadonia, B., et al., filed Sep. 22, 2017.

Non-Final Office Action dated May 24, 2018, for U.S. Appl. No. 15/720,937, of Grassadonia, B., et al., filed Sep. 29, 2017.

Notice of Allowance dated Jul. 5, 2018, for U.S. Appl. No. 15/713,322, of Grassadonia, B., et al., filed Sep. 22, 2017.

Non-Final Office Action dated Aug. 9, 2018, for U.S. Appl. No. 16/011,556, of Brock, C.M., et al., filed Jun. 18, 2018.

Non-Final Office Action dated Aug. 16, 2018, for U.S. Appl. No. 16/011,559, of Grassadonia, B., et al., filed Jun. 18, 2018.

Notice of Allowance dated Sep. 4, 2018, for U.S. Appl. No. 16/011,556, of Brock, C.M., et al., filed Jun. 18, 2018.

Notice of Allowance dated Sep. 10, 2018, for U.S. Appl. No. 16/011,559, of Grassadonia, B., et al., filed Jun. 18, 2018.

Non-Final Office Action dated Nov. 29, 2018, for U.S. Appl. No. 16/147,483, of Brock et al., filed Sep. 28, 2018.

Non-Final Office Action dated Nov. 29, 2018, for U.S. Appl. No. 16/147,466, of Brock et al., filed Sep. 28, 2018.

International Search Report and Written Opinion for International Application No. PCT/US2018/043382, dated Oct. 25, 2018.

Final Office Action dated Mar. 26, 2019, for U.S. Appl. No. 16/147,483, of Brock, C.M., et al., filed Sep. 28, 2018.

Final Office Action dated Apr. 25, 2019, for U.S Appl. No. 16/147,466, of Brock, C.M., et al., filed Sep. 28, 2018.

Restriction requirement dated Sep. 20, 2019, for U.S. Appl. No. 16/457,877, of Stipech K.D., et al., filed Jun. 28, 2019.

Non-Final Office Action dated Oct. 18, 2019, for U.S. Appl. No. 16/147,483, of Brock et al., filed Sep. 28, 2018.

* cited by examiner

CRYPTOCURRENCY PAYMENT NETWORK

CROSS REFERENCE TO RELATED APPLICATIONS

This application is a continuation under 35 U.S.C. § 120 of U.S. patent application Ser. No. 16/011,556, filed Jun. 18, 2018, which is a continuation under 35 U.S.C. § 120 of U.S. patent application Ser. No. 15/713,322, filed Sep. 22, 2017, which claims the benefit under 35 U.S.C. § 119(e) of U.S. Provisional Application No. 62/537,395 filed on Jul. 26, 2017, all of which are expressly incorporated by reference herein in their entirety.

TECHNICAL FIELD

The present technology pertains to technologies for accepting virtual currencies in a point of sale transaction.

BACKGROUND

Virtual currencies and especially cryptocurrencies such as bitcoin, ethereum (ether), litecoin, etc. have been increasing in popularity in recent years. Holders of bitcoin and other cryptocurrencies are not tied to any government, are decentralized, and allow direct transactions, while still maintaining the trust and stability of fiat currencies. Bitcoin in particular appears to be more than a passing fad and with billions in total value in distribution, bitcoin stores significant economic potential.

However, despite the popularity of cryptocurrencies to date, all cryptocurrencies face the same drawback in that they are not widely accepted. Presently, cryptocurrencies, like bitcoin, are not accepted by most retail merchants, or even by most online merchants. The lack of mass adoption of cryptocurrencies thus far may be attributed to a number of different factors. For one, cryptocurrencies are known to be associated with long transaction times. There is lots of research and development attempting to increase the speed of such transactions, but only with small improvements to date to such an extent that the processing time remains impractically large. For example, it is not practical for a coffee shop to sell a coffee in a transaction that could take hours before the transaction is confirmed by recording the transaction to the blockchain. A further deterrent to accepting cryptocurrencies by merchants is that cryptocurrencies are associated with anonymous identities. This feature of digital currency makes it susceptible to money laundering activities and exposes merchants to increased chances of transacting with criminals, which may put them in violation of state and federal laws. Hence, the security of transactions for merchants is currently poor. As well as these technical problems, there are business related issues to be overcome. For example, cryptocurrency exchange rates with fiat currencies can fluctuate widely, and this may be a risk that business owners don't want to take.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
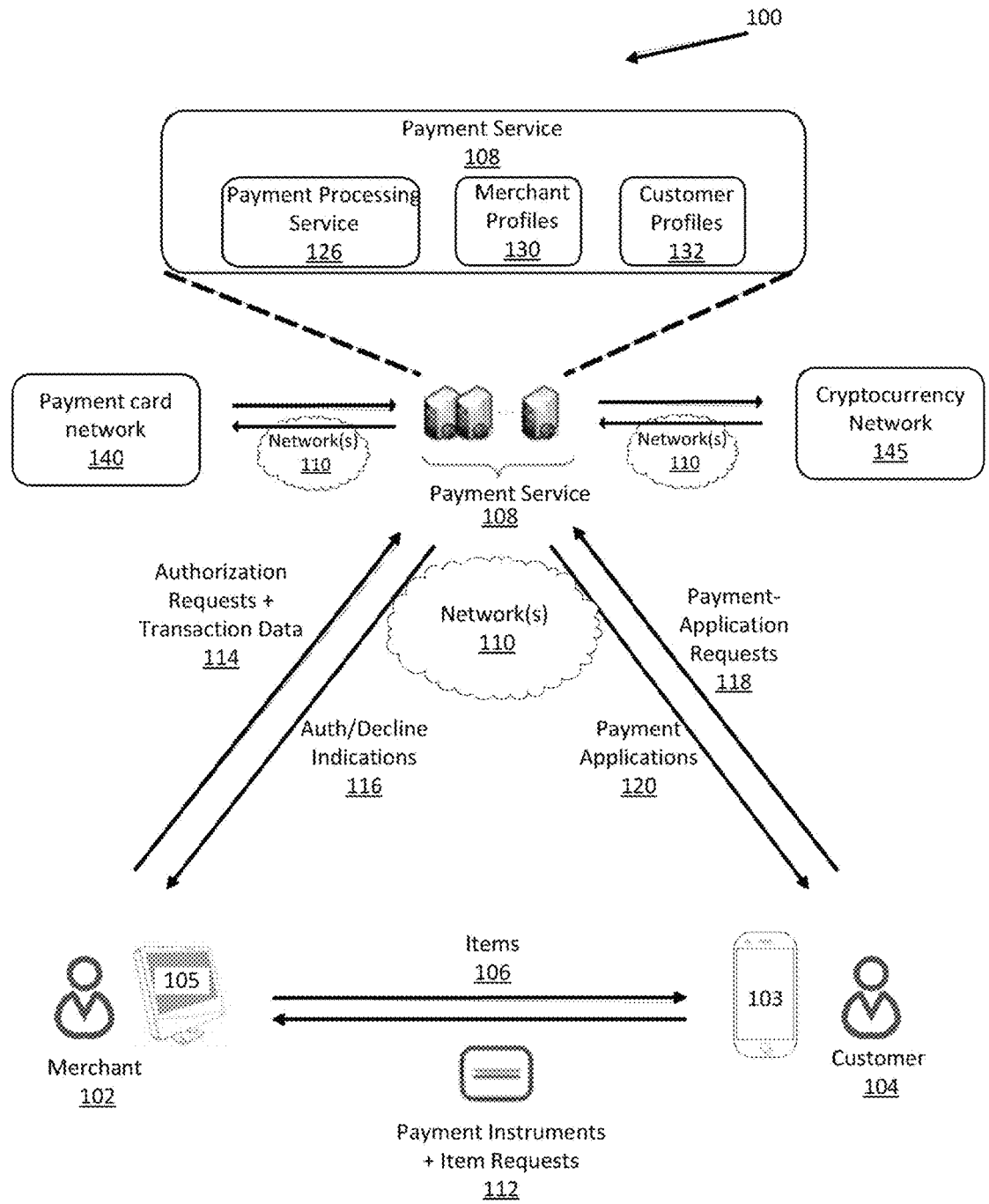
FIG. 1A shows an example of a payment service network in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a payment service capable of accepting a greater diversity of currencies including fiat currencies (US dollars, Euro, Rupee, etc.), and non-fiat currencies including virtual currencies including cryptocurrencies (bitcoin, ether, etc.), commercial paper (loans, contracts, forms, etc.), and securities (stocks, bonds, derivatives, etc.), than a traditional payment system in a transaction between a customer and a merchant, and specifically for a payment service to solve or ameliorate problems germane to transactions with such currencies. Specifically, the payment service described herein can facilitate real-time (or substantially real-time) transactions, allowing a customer to pay in any currency of their choice, while the merchant can receive payment in a currency of their choice. In some embodiments, the payment service can eliminate barriers to transactions common when using non-fiat currencies, while maintaining the benefits of transacting in those non-fiat currencies. For example, when transacting with a virtual currency the payment service can eliminate or substantially reduce the risk of transactions with criminal parties, and avoid latency common in virtual currency transactions, while maintaining the anonymous benefits of virtual currency transactions.

Specifically, the present technology permits a first party to pay in any currency, while permitting the second party to be paid in any currency. In this way, the technology provides benefits that remove barriers to transactions that might inhibit international commerce, or commerce with certain types of currency.

Additionally, the present technology, through the presence of a trusted payment service, can increase trust in transactions taking place in multiple currencies.

Such increased trust can also be an important benefit of the present technology when a party to the transaction wishes to remain anonymous to another party in the transaction. Anonymity can reduce trust, and in some cases, transactions with anonymous parties can even be illegal. The present technology includes systems and method of overcoming such data security concerns, especially in cryptocurrency transactions wherein aliases are commonplace.

The present technology further overcomes latency disadvantages germane to cryptocurrency transactions. For example bitcoin transactions can take, on average, 10 minutes to be confirmed. This is far too long for many transactions. The present technology can process and approve a cryptocurrency transaction in near real time, i.e., in seconds. In some embodiments, cryptocurrency transaction approvals can be similar to the amount of time taken to approve a credit card transaction.

Throughout this description reference may be made toward specific currencies such as bitcoin or the United States dollar. Such references will be understood to be merely examples of other currencies of like character. For example, references to bitcoin should be understood to be interchangeable for any cryptocurrency, and particularly cryptocurrencies recorded on a public blockchain. References to the United States dollar should be understood to be interchangeable for any fiat currency managed by a central authority, such a country (United States, China, etc.), or regional body (European Union, etc.).

Some example implementations of the novel payment service (including servers and server software, merchant devices and software, and client devices and software) are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1A illustrates an example environment 100 that includes merchant 102 that conducts transactions with customer 104 (or "user 104") for items 106 offered by the merchant 102. FIG. 1 also illustrates a payment service system 108 (also referred to as "payment service"), coupled to merchant point of sale (POS) device 105 and customer device 103 via a network 110, to authorize payment instruments of customer 104.

Customer 104 may engage in transactions with merchant 102 to obtain items 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g. item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 can provide the amount that is due to the merchant using cash or other payment instrument 112 (e.g., a debit card, a credit card, a stored-value or gift card, a check, through an electronic payment application on device 103 carried by the customer, or the like). The merchant can interact with POS device 105 to process the transactions, such as by inputting (e.g., manually, via a magnetic card reader, NFV reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is "dipped" into the reader, such as chips that comply with the Europay, MasterCard, Visa (EMV) standard, i.e. EMV cards. In other examples, other types of payment instruments include cards or computing devices that communicate via radiofrequencies such as a radiofrequency identification tags, and near field communication devices, etc.

During the transaction, POS device 105 can determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 can send the transaction information to payment service 108 over network 110, either substantially contemporaneously with the conducting of the transaction (in the case of online transactions) or later when POS device 105 is in the online mode (in the case offline transactions).

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide the stored information (or some subset of it) to the payment service 108 over the network 110. The network 110 may represent any one or more wired or wireless networks, such as a Wi-Fi network, a cellular network, or the like. In an online transaction, POS device 105 may send this information to payment service 108 over network 110 substantially contemporaneously with the transaction with the customer.

After merchant 102 receives the payment information from customer 104, merchant 102 may send respective authorization requests, along with information regarding the respective transactions, to payment service 108, as illustrated at 114. Payment service 108 may include payment processing service 126, merchant profiles 130, and customer profiles 132.

The payment processing service 126 may function to receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

Generally, when a customer and a merchant enter into an electronic payment transaction, the transaction is processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110 to conduct financial transactions electronically. Payment processing service 126 can also communicate with one or more computing devices of one or more banks, processing/acquiring services, or the like over the network 110. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service 108.

An acquiring bank may be a registered member of a card association (e.g., Visa®, MasterCard®), and may be part of a card payment network 140. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In transactions involving cryptocurrency, payment service 108 can communicate over network(s) 110 with cryptocurrency network 145. Such networks can include for example, the Bitcoin network, the Ethereum network, etc. Cryptocurrency networks are commonly associated with a network of parties that cryptographically verify and validate transactions and record transactions on copies of a distributed ledger commonly called the blockchain. Once a transaction has been validated, cryptocurrency network can approve the transaction by writing the transaction to the blockchain. The time for such processes to complete can be impractically long for many applications.

While FIG. 1 illustrates merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective ones of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) determines when the customer visits physical premises or a digital presence of the merchant. For instance, the device 103 of the customer 104 may include an application (e.g., an application provided by payment service 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service 108 may determine when the customer is present at the merchant in any other number of ways. In each instance, after payment service 108 receives an indication that customer 104 is located at merchant 102, the payment service 108 may determine whether to send one or more previously expressed item preferences of the customer to the merchant.

In addition, customer 104 may desire to receive an instance of a payments application, such as a mobile wallet application, from the payment service 108. FIG. 1 illustrates, at 118, that the customer 104 may send payment-application requests to payment service 108. In response, at 120, payment service 108 may provide instances of the application back to customer device 103. In addition, payment service 108 may map an identification of the instance of the application to the customer profile.

According to an implementation of the present subject matter, the customers and merchants can send and receive payments in virtual currencies via the payment service for purchase of items or a selected set of items. In another implementation, the customers send payments in virtual currencies via the payment service, while the payment service converts a first virtual currency into another virtual currency or a fiat currency of merchant's choice.

Figure 1B:
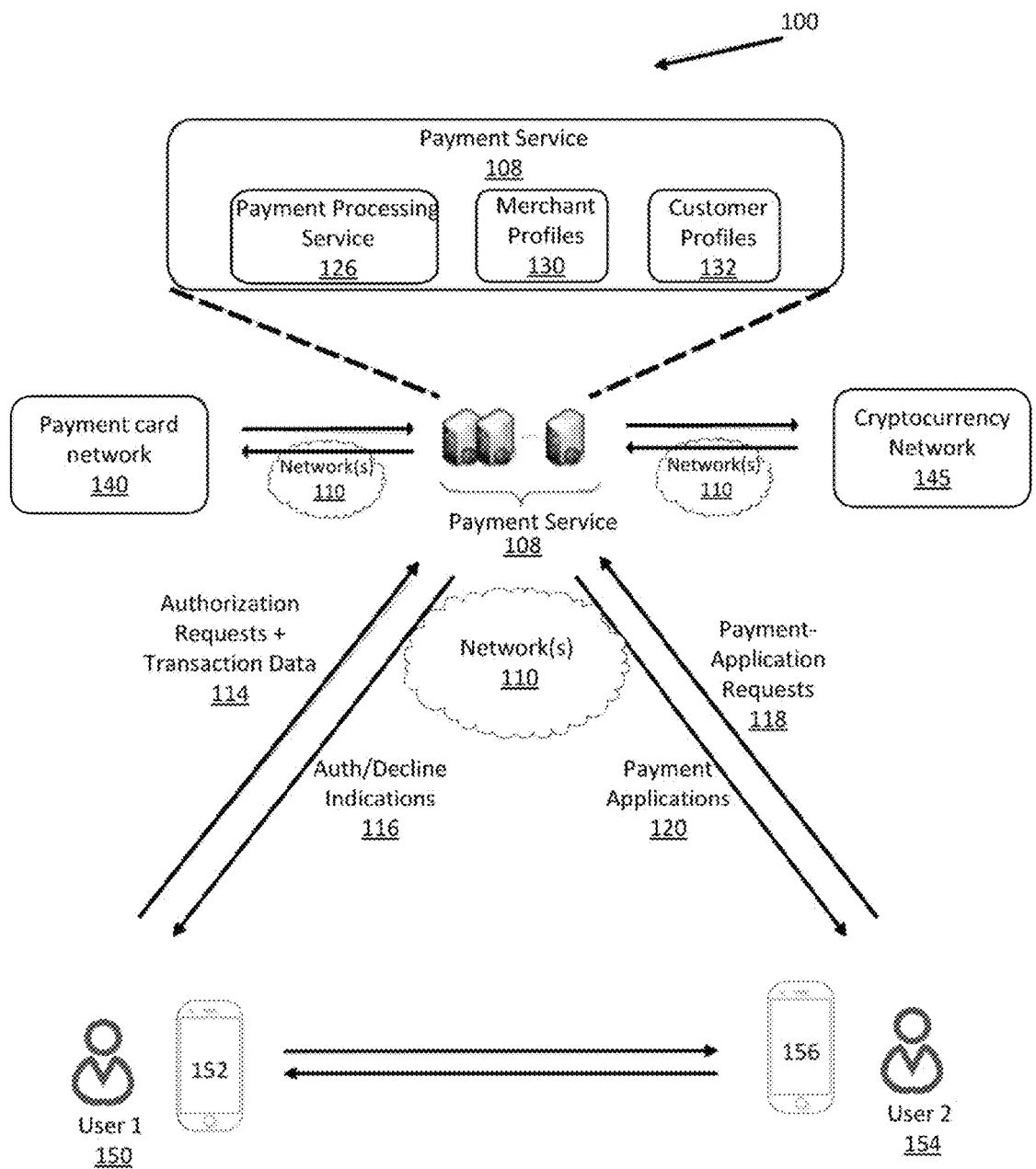
FIG. 1B shows an example of a payment service network in accordance with some embodiments.

FIG. 1B illustrates another embodiment of example environment 100 except that in FIG. 1B a transaction is between a first user 150 operating device 152, and a second user 154 operating device 156. Devices 152 and 156 can be a computing device with an application provided by payment service 108 executing thereon. In some embodiments, the application can be point of sale application. In some embodiments, the application can be a mobile wallet application. In some embodiments the application can be an application provided by a third party capable of accessing at least one payment account.

FIG. 1B illustrates the broader concept that the present technology contemplates that currency can be sent from any party of any character (merchant, user, bank, etc.) to any other party of any character using the innovations described herein.

Figure 2:
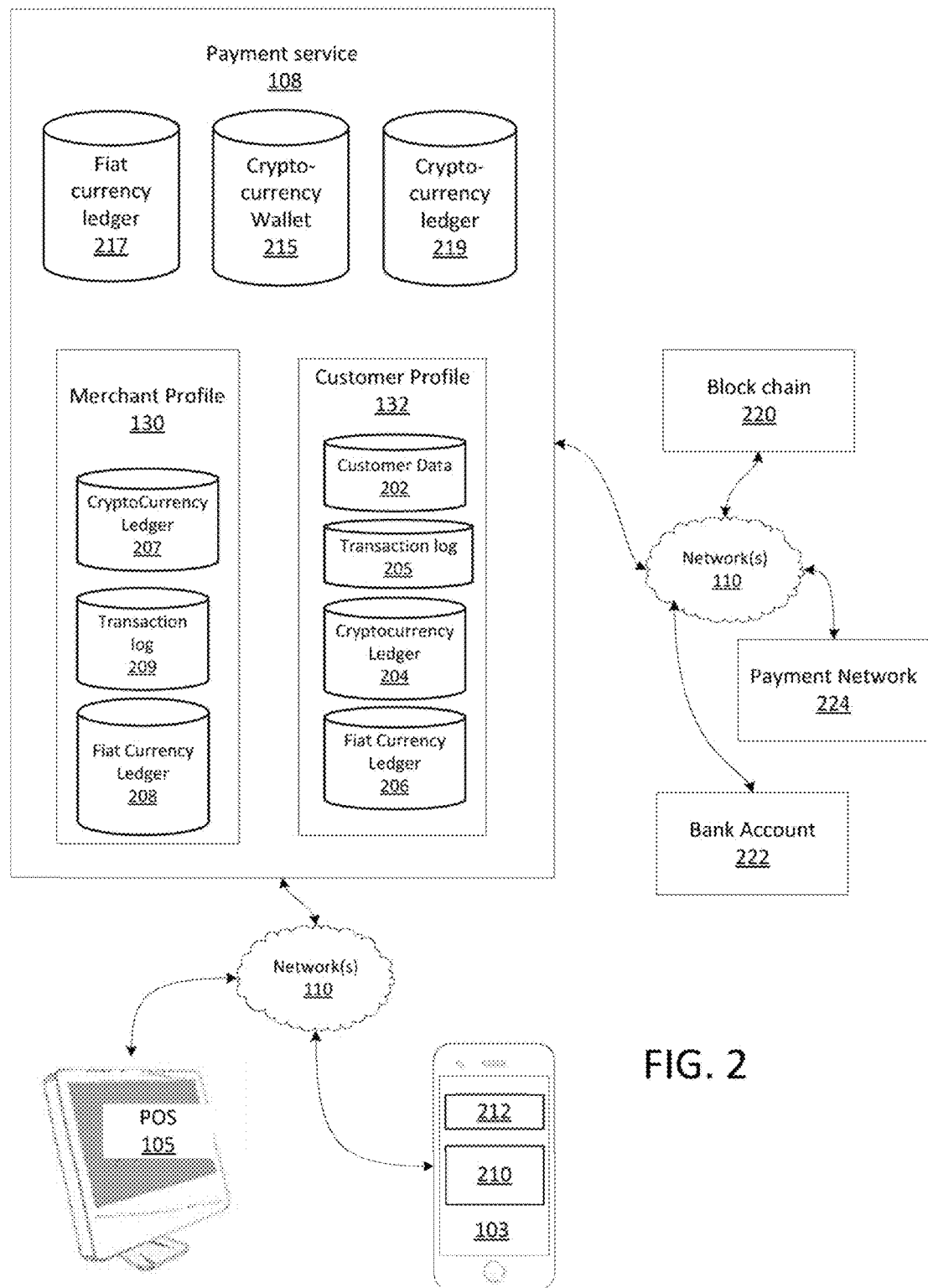
FIG. 2 illustrates and example payment service in accordance with some embodiments.

FIG. 2 illustrates an example system architecture that allows customer 104 to pay with a virtual currency, especially a cryptocurrency that utilizes a blockchain to record transactions. FIG. 2 is designed to overcome at least the above identified challenges common in payment transactions involving virtual currencies.

As introduced with respect to FIG. 1, payment service 108 can store customer profile 132. Customer profile 132 can include customer data 202 which can include customer identifying information (name, contact information, etc.), records of past transactions 205 involving payment service 108 by customer 104, information regarding linked accounts (credit card information, bank account information, etc.), information regarding services utilized by customer profile 132 (e.g., the account utilizes a mobile wallet application 210 provided by payment service 108, etc.).

In addition to customer data 202, customer profile 132 can also include a ledger for any accounts managed by payment service 108 on behalf of customer 104. It will be appreciated that customers having accounts managed by the payment service is an aspect of the technology that enables the technical advantages of increased processing speed and improved security. As illustrated in FIG. 2, customer profile 132 includes customer cryptocurrency ledger 204, and a customer fiat currency ledger 206 indicating that customer 104 utilizes payment service 108 to manage accounts a cryptocurrency (such as bitcoin), and a fiat currency (such as US dollars), respectively. In some embodiments customer profile 132 for customer 104 can include ledgers for more or less accounts. It will be appreciated that in some embodiments the ledgers are logical ledgers, and the actual data can be represented in a single database.

Each account ledger (204, 206) can reflect a positive balance when customer 104 funds the accounts. An account can be funded by transferring currency in the form associated with the account from an external account (e.g., transferring a value of cryptocurrency to payment service and the value is credited as a balance in cryptocurrency ledger 204), or by purchasing currency in the form associated with the account from the payment service using currency in a different form (e.g., buying a value of cryptocurrency from payment service 108 using a value of fiat currency reflected in fiat currency ledger 206, and crediting the value of cryptocurrency in cryptocurrency ledger 204), or by conducting a transaction with another user (customer or merchant) of the payment service wherein the account receives incoming currency. When an account is funded by transferring cryptocurrency from an external account, this will be when an update to the public blockchain is carried out. Importantly, this update of the public blockchain need not take place at a time critical moment, such as when a transaction is being processed by a merchant in store. In some embodiments customer profile 132 can include preferences for maintaining balances in cryptocurrency. In such embodiments, payment service 108 can automatically debit fiat currency ledger 206 to increase cryptocurrency ledger 204, or a payment card associated with customer profile whenever cryptocurrency balances fall below a stated level. Conversely, in some embodiments, payment service can automatically credit fiat currency ledger 206 to decrease cryptocurrency ledger 204 whenever cryptocurrency balances rise above a stated level. In some embodiments, automatic transactions can be further defined by an exchange rate between the cryptocurrency and the fiat currency such that transactions to buy or sell cryptocurrency can occur when exchange rates are favorable.

Figure 9:
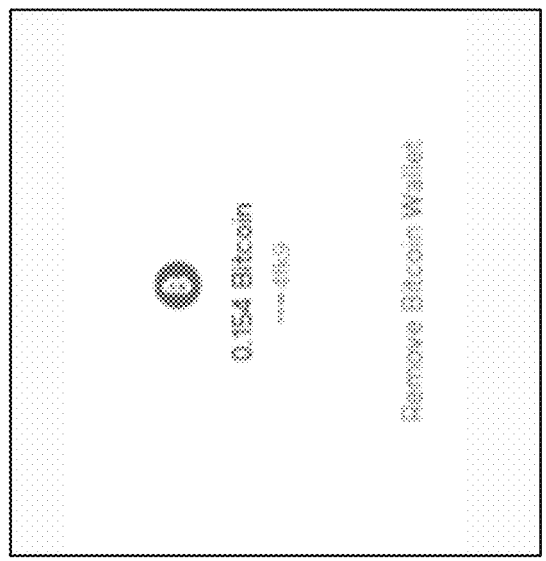
FIG. 9 illustrates example graphical user interfaces in accordance with some embodiments.
Figure 9:
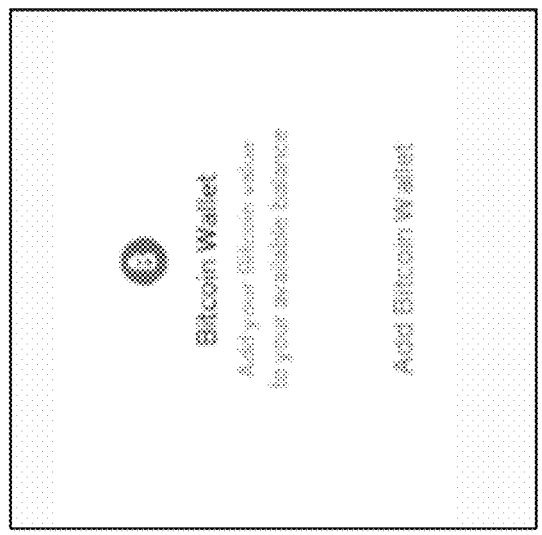
Figure 9:
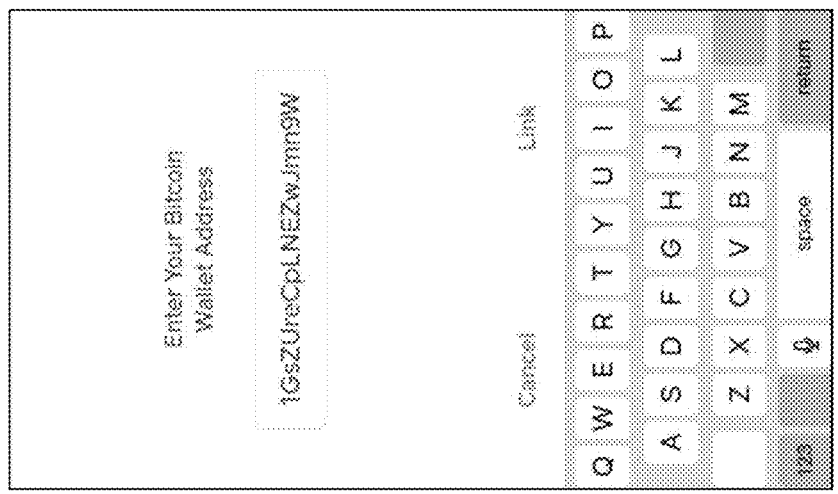

With specific reference to funding a cryptocurrency account, customer 104 may have a balance of cryptocurrency stored in third party digital wallet 212 on customer 104's computing device 103 unrelated to payment service 108 and customer 104 can transfer all or a portion of the balance of the cryptocurrency stored in third party digital wallet 212 to payment service 108 as is well known to those of skill in the art. Such a transaction requires customer 104 to transfer an amount of the virtual currency in a message signed by customer 104's private key to an address provided by payment service 108. FIG. 9 illustrates a user interface screen 624 showing a user entering a third party digital wallet 212 address associated with the balance of cryptocurrency they would like to transfer into payment service 108. The transaction is sent to miners to bundle the transaction into a block of transactions and to verify the authenticity of the transactions in the block. Once a miner has verified the block, the block is written to a public, distributed blockchain 220 where payment service 108 can then verify that the transaction has been confirmed and can credit customer's cryptocurrency ledger 204 with the transferred amount.

In some embodiments, payment service 108 can individually acquire cryptocurrency from a third party source. Payment service 108 cryptocurrency wallet 215 can be associated with many different addresses, and can vary addresses used to acquire cryptocurrency so that its holdings are represented under a variety of addresses on blockchain 220. When payment service 108 has its own holdings of cryptocurrency, customers, such as customer 104, can acquire cryptocurrency directly from payment service 108. In some embodiments, payment service can include logic for buying and selling cryptocurrency in order to maintain a desired level of cryptocurrency. The desired level can be based on a volume of transactions over a period, balances of collective customer profiles cryptocurrency ledgers, exchange rates, or trends in changing of exchange rates such that the cryptocurrency is trending towards gaining or loosing value with respect to the fiat currency. In all of these scenarios, the buying and selling of cryptocurrency, and therefore the associated updating of the public ledger is separate from any customer—merchant transaction, and therefore not necessarily time-sensitive.

While payment service 108 has credited customer 104's cryptocurrency ledger 204, the transferred cryptocurrency (data with address provided for receipt of transaction and a balance of cryptocurrency transferred in transaction) is stored in payment service 108's cryptocurrency wallet 215. Additionally, while payment service 108 recognizes that customer 104 retains the value of the transferred cryptocurrency through crediting customer 104's cryptocurrency ledger 204, any person that inspects blockchain 220 will see the cryptocurrency as having been transferred to payment service 108. In some embodiments, payment service 108's cryptocurrency wallet 215 can be associated with many different addresses. In such embodiments any person that inspects blockchain 220 may not easily associate all cryptocurrency stored in cryptocurrency wallet 215 as belonging to the same entity. It is this presence of a private ledger that is used for real-time transactions and maintained by the payment service 108, combined with updates to the public ledger at other times, that allows for extremely fast transactions using cryptocurrency to be achieved.

As addressed above, in some embodiments customer 104 can also have other accounts maintained by payment service 108. For example customer 104 can also have an account in US dollars. Such account can be funded by transferring money from bank account 222 at a third party bank to an account maintained at payment service 108 as is conventionally known. The transferred money will be reflected in fiat currency ledger 206.

Customer 104's fiat currency ledger 206 or cryptocurrency ledger 204 can be credited when conducting a transaction with another user (customer or merchant) of the payment service wherein the account receives incoming currency.

Additionally, customer 104 may also have one or more external payment cards registered with payment service 108 and recorded in customer data 202. Unlike cryptocurrency accounts and fiat currency accounts recorded in cryptocurrency ledger 204 and fiat currency ledger 206 respectively, external payment card accounts are not accounts managed by payment service 108. Instead, an appropriate external payment network 224 processes transactions conducted with payment cards.

Additionally, customer 104 may also have one or more internal payment cards registered with payment service 108. Internal payment cards can be linked to all accounts associated with customer profile 132. In some embodiments, options with respect to internal payment cards can be adjusted and managed using application 210. For example, when customer profile 132 includes multiple payment accounts (e.g., cryptocurrency and fiat currency), application 210 can set one of those accounts to be the default account for debits or credits when using an internal payment card.

Customer 104 can access and monitor customer profile 132 including payment cards registered with payment service 108, cryptocurrency ledger 204, and fiat currency ledger 206 through application 210. Application 210 can be a customer facing application provided by payment service 108, or that is configured to access customer profile 132 through use of one or more APIs provided by payment service.

In some embodiments, application 210 can provide digital wallet functionality including storing payment methods and permitting electronic payments by customer device 103 at the instruction of application 210.

Figure 3:
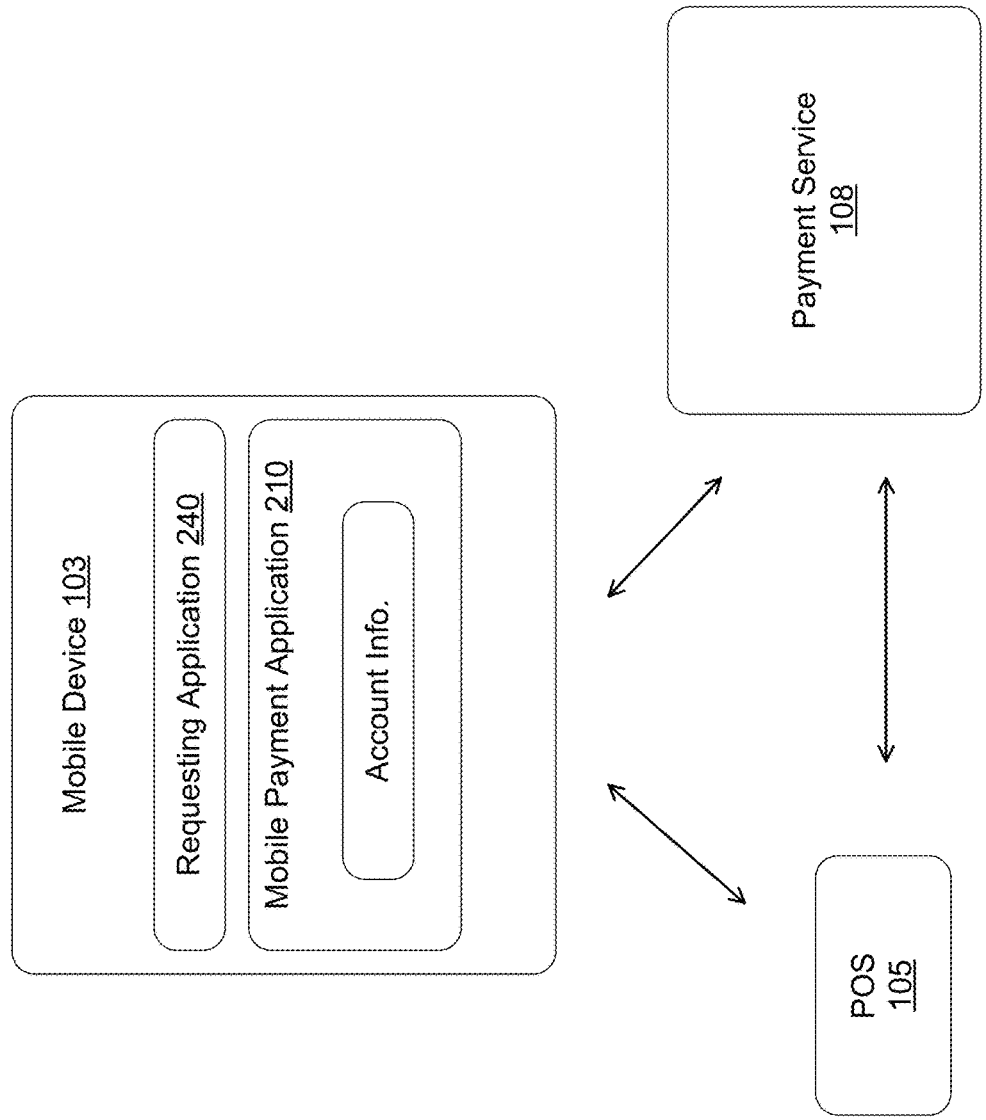
FIG. 3 illustrates and example mobile device and payment application in accordance with some embodiments.

FIG. 3 illustrates an example mobile device 103 and payment application 210. In some embodiments, a mobile payment application 210 runs on the customer 104's mobile device 103. Mobile device 103 can also include other e-commerce applications ("requesting applications") 240 that are associated with one or more merchant systems and can be used by the customer to purchase products or services. The requesting applications 240 can also be websites, forums, URLs, application program interfaces (APIs), or any source website or application that either hosts a description of the product or service and/or provides an option to buy the product or service, irrespective of whether it is directly connected to the merchant POS device 105. The mobile payment application 210 can also be a website provided by payment service 108, or any source website or application that provides a portal to send and accept payments for transactions using payment service 108. The requesting application 240 and the mobile payment application 210 can be accessed through a web browser (e.g., Chrome® or Safari®) on the mobile device 103, in one example. In another example, the requesting application 240 and the mobile payment application 210 can be software applications downloadable via an application store (e.g., Google Play Store, etc.). Once accessed or registered into the applications 240 and 210, the web browser or application remembers the credentials for subsequent customer visits (for example, through web browser authentication, web cookies, web history, etc.) allowing the customer to access the application without logging-in into an account. The description herein is with reference to the mobile payment application 210 as an installed application; however it will be understood that the mobile payment application as an authenticated or unauthenticated application on a web browser is within the meaning of the term.

The mobile payment application 210 can include an electronic wallet application, money transfer application (e.g., application for sending and receiving money via email or phone), or any other application having an account identifier that is linked to one or more payment cards and/or bank accounts and can be used by the owner of the mobile device to initiate transactions. Such transactions can include traditional purchase transactions between customers and merchants or service providers, person-to-person transactions and the like.

In some embodiments, mobile payment application 210 can be used to manage internal payment cards (i.e., payment cards issued by payment service 108 to users having a customer profile 132). In some embodiments, options with respect to internal payment cards can be adjusted and managed using application 210. For example, when customer profile 132 includes multiple payment accounts (e.g., cryptocurrency and fiat currency) application 210 can set one of those accounts to be the default account for debits or credits when using an internal payment card as illustrated in FIG. 10C.

Collectively, all tools for offering payment are herein referred to as payment instruments. For example payment instruments can refer to mobile device 103 running mobile payment application 210, can refer to internal payment cards, external payment cards, etc. The use of the term payment instrument does not imply a mechanism of use. For example mobile device 103 may be utilized via NFC communications, or via use of software on mobile device 103 to send messages through web forms, applications, APIs, or messaging applications. As an additional example, payment cards, whether internal or external, can be presented to a merchant to be read, or a card number can be entered into a terminal under the control of the merchant or under the control of the customer. In some embodiments, a payment instrument can include multiple payment instruments, for example, such as when utilizing mobile device 103 to enter a payment card number. Throughout this description, specific payment instruments may be discussed, however, the specific payment instrument should not be considered limiting, and persons of ordinary skill in the art will appreciate instances in which a payment instrument such as a payment card can be substituted for another payment instrument such as a mobile device, and vice versa.

FIG. 4 illustrates an example method of using application 210 to pay merchant 102 at its POS device 105. The point of sale transaction can be initiated by customer 104 interacting with a merchant 102 directly, by customer 104 using customer device 103 to remotely start a tab with merchant 102 through communication with payment service 108, by customer 104 interacting directly with POS device 105, or by another other known mechanism. Regardless of the mechanism of initiating the point of sale transaction, POS device 105 can receive (302) an identification of items for purchase and can calculate or receive a value owed in any monetary currency selected by the merchant—in this example US Dollars.

Merchant 102 or POS device 105 can prompt customer 104 to make payment for the items in the amount of the value owed. Customer 104 can operate payment application 210 on customer device 103, which presents (304) payment options. Payment application 210 can receive a selection (306) by customer 104 of a cryptocurrency as the payment option.

In some embodiments, payment application 210 can also provide an option to select (307) an alias from a list of previously used aliases or to provide an alias to be used in conducting the transaction. In some embodiments, the alias can be a machine-readable code, such as a QR code, that can be used to identify the customer.

In some embodiments, the alias is registered as part of customer profile 132 such that the customer profile can be identified from the alias, or the alias in combination with another item of information such as a customer device-identifying attribute. In some embodiments, the alias can be conceived and used for the first time in a given transaction. In some embodiments, an alias can be reused for a specific merchant, unless the customer selects to provide a new alias to that merchant.

In some embodiments, the alias can be sent in the clear, meaning, not encrypted, so that the merchant can utilize the alias as a mechanism to identify the transaction or the customer. However, any account information, or other customer identifying information would be encrypted so as to not be provided to the merchant and protect the anonymity of the user.

Payment application 210 can instruct customer device 103 hardware to communicate (308) information declaring that customer 104 would like to pay utilizing cryptocurrency, customer 104 alias, and encrypted customer profile information. The encrypted customer profile information can include at least some data useable by payment service 108 to identify customer profile 132. In some embodiments, this data can include a user name and password. In some embodiments, this data can include an account number and a PIN (or other verification of identity). In some embodiments, verification of identity can be performed by customer device 103 through biometric authentication or other means, and confirmation of identity through a password or PIN does not need to be passed to the server. In some embodiments, payment service can identify customer profile 132 through use of a registered alias, perhaps in combination with other information.

Importantly, any information that can be used to identify customer 104 should be encrypted and not shared with merchant 102 unless it is an alias. If customer 104 wishes their identity to be known to merchant 102, customer 104 can provide their actual name as their alias (307). In this way, customer 104 can take advantage of the anonymity that is common in cryptocurrency transactions. At the same time, merchants can have confidence that they are transacting with a legitimate party since they can trust that payment service 108 has sufficiently vetted and identified the customer.

POS device 105 can receive the declaration of payment by cryptocurrency along with the other data described above, but merchant 102, may not wish to receive payment in cryptocurrency. Merchant profile 130 might not be associated with a cryptocurrency account, or even if the merchant does have a cryptocurrency account within payment service 108, merchant profile might indicate that it wants all POS transactions conducted in US dollars, and would like deposits into merchant fiat currency ledger 208.

In some embodiments, rather than using mobile device 103 to provide payment information, customer can present an internal payment card linked to a cryptocurrency account. Point of sale device 105 can utilize the card information to communicate with payment service 108 to learn that the customer desires to pay using cryptocurrency.

In some embodiments, rather than mobile device 103 communicating directly with POS device 105 via NFC, Bluetooth, or Local Area Network, mobile device can send a message to POS device over a Wide Area Network or through an intermediary. Such message can take any form, including a text message that identifies the customer via an alias, and declares a desire to pay using cryptocurrency.

The merchant can choose which currency they would like to receive deposits in. The merchant POS 105 user interface can provide the merchant options: 1) auto-convert the cryptocurrency to USD or 2) invest in the cryptocurrency. If the second option is chosen and the merchant does not have a cryptocurrency wallet, payment service 108 will auto-create cryptocurrency ledger 207 for the merchant. In some embodiments, this user interface can be bypassed when merchant 130 specifies that merchant 102 is not interested in receiving virtual currency. In some embodiments, this user interface can be bypassed when a tag (described below) associated with the transaction specifies rules for the transaction.

Figure 4A:
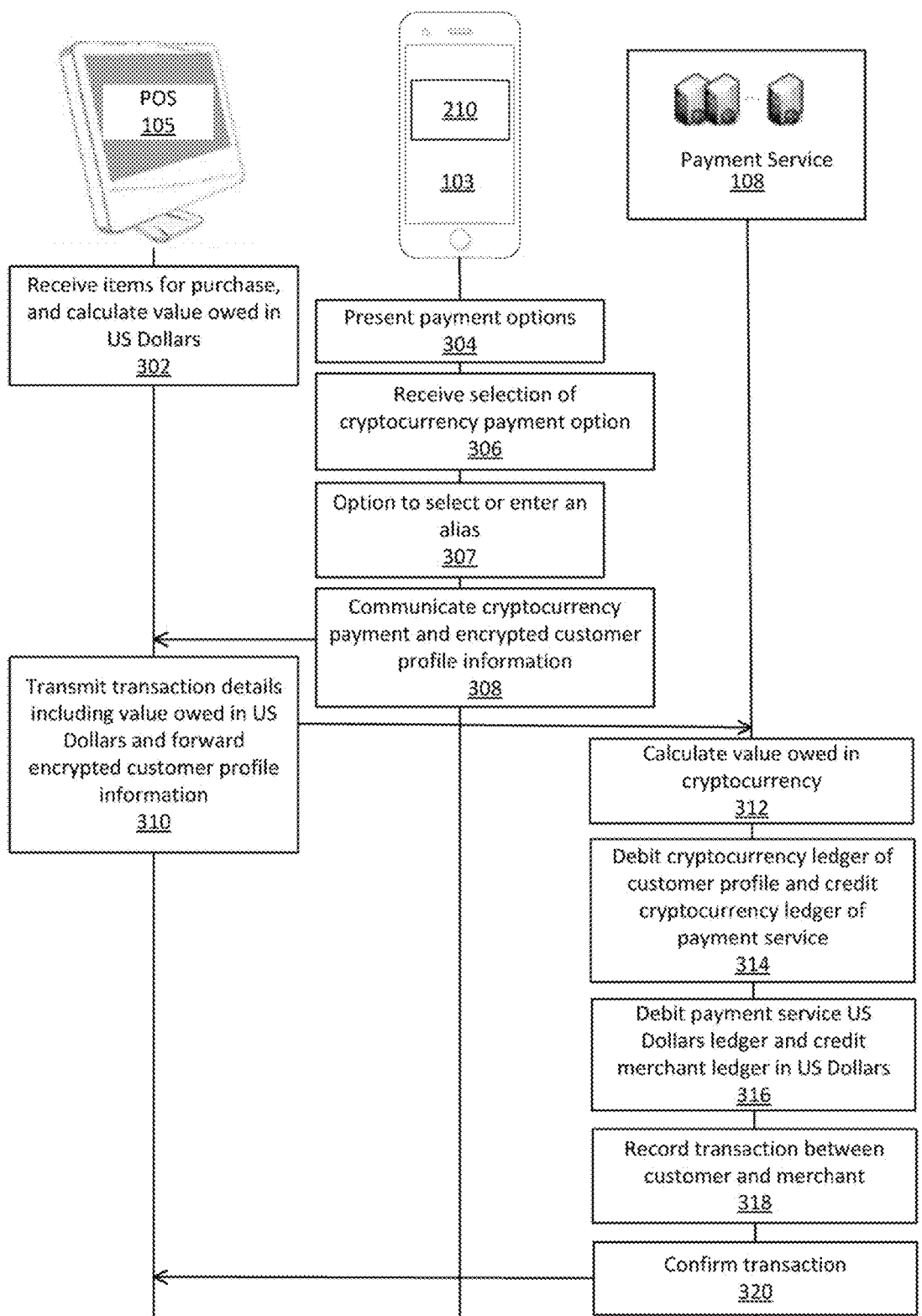
FIG. 4A illustrates an example method of paying a merchant using a virtual currency in accordance with some embodiments.
Figure 5:
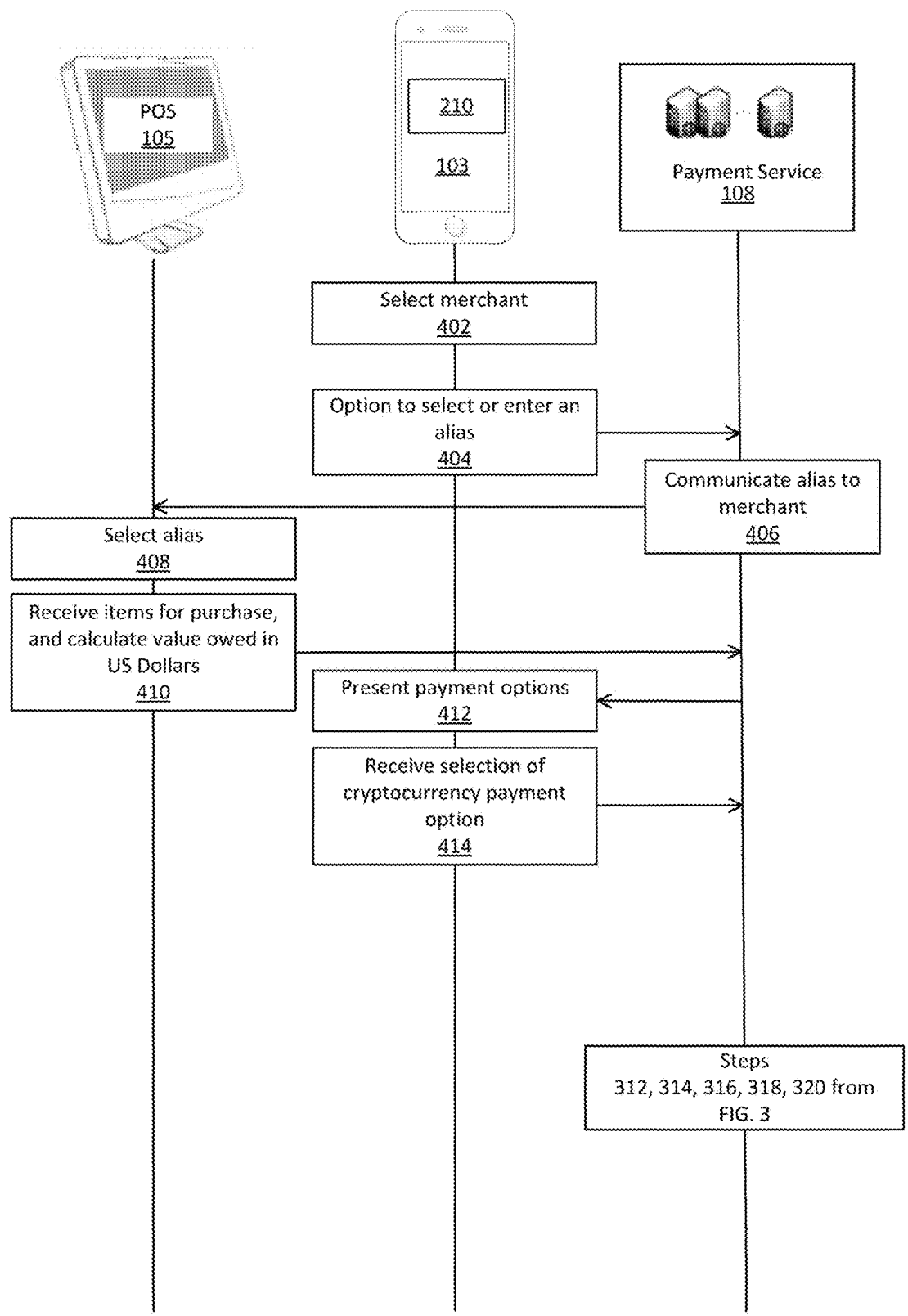
FIG. 5 illustrates an example method of paying a merchant using a virtual currency in accordance with some embodiments.

In the embodiments illustrated in FIG. 4A and FIG. 5 merchant 102 has selected to auto-convert the cryptocurrency to US dollars. Accordingly, merchant 102's POS device 105 transmits (310) transaction details including the value owed by customer 104 in US dollars, along with the information received from client device 103 (at step 308), to payment service 108.

Payment service 108 receives the transaction details and encrypted cryptocurrency payment information, and calculates (312) a value in cryptocurrency using an exchange rate between the cryptocurrency and the fiat currency (US Dollars in this example) sufficient to cover the value owed to merchant 102. In some embodiments, payment service 108 can also add a transaction fee on top of the transaction to be paid to payment service 108.

Payment service can then debit cryptocurrency ledger 204 for the value calculated at step 312 and credit payment service 108's cryptocurrency ledger 219 with the same value.

Since this transaction is an inter-network transaction (within payment service 108) the transaction does not need to be transmitted to blockchain 220. Blockchain 220 continues to reflect that payment service 108 is the holder of the cryptocurrency, and this remains true. Only the obligations between payment service 108 and customer 104 have changed. Since the transaction does not need to be recorded on blockchain 220 the transaction can be completed immediately without waiting on confirmation of the transaction from blockchain 220. Transaction processing speed is therefore increased. Furthermore, by only updating the blockchain 220 when cryptocurrency is bought or sold outside of the payment service 108, the amount of data transmitted to and from the blockchain 220 is reduced, therefore increasing the available bandwidth of the system(s) managing the public ledger. In addition, as cryptocurrency transactions increase in number, the processing demands on the public ledger need not increase proportionally as the bulk of the transactions are in fact carried out within the payment service 108.

Additionally, the present transaction is actually more anonymous than a normal transaction on blockchain 220 since in a normal blockchain transaction it is at least possible to follow transactions flowing from one address to another. It is true that the identity of the user can be anonymous on blockchain 220, but it is possible to track the flow of the cryptocurrency. However, the present technology both keeps the identity of the customer anonymous to those that the customer transacts with, but it is also not possible to track the flow of the cryptocurrency by public parties.

In addition to debiting customer 104's cryptocurrency ledger 204, payment service 108 also debits (314) its own cash ledger (in US Dollars) and in turn credits merchant 102's fiat currency ledger 108 with the value owed. In some embodiments, payment service 108 may take a transaction fee out of the value owed.

While payment service 108 ledgers (cash ledger 217, cryptocurrency ledger 219) reflect two different transactions—one with customer 104 and one with merchant 102—from the perspective of customer 104 and merchant 102 only one transaction has taken place. Accordingly, payment service 108 can record (318) the transaction between customer 104 and merchant 102 in merchant and customer transaction log 205, and in merchant transaction log 209. The transaction as recorded in at least the merchant transaction log 209 only identifies customer 104 by their alias.

Payment service 108 can then send a transaction confirmation to POS device 105.

While some transactions described herein occur in multiple parts (e.g., transaction between customer and merchant can be broken into a transaction between customer and payment service and a transaction between payment service and merchant) such transactions should not be viewed similarly to other known multi-part transactions such as escrow and guaranties, both of which require additional aspects (escrow requires proof of performance before release of funds) (guaranties regard contractual obligations to provide guaranties). Rather, the multi-part transactions described herein are provided, in part, due to the unique architecture of the present technology, and improvements in payment networks to provide the described and apparent benefits.

Figure 4B:
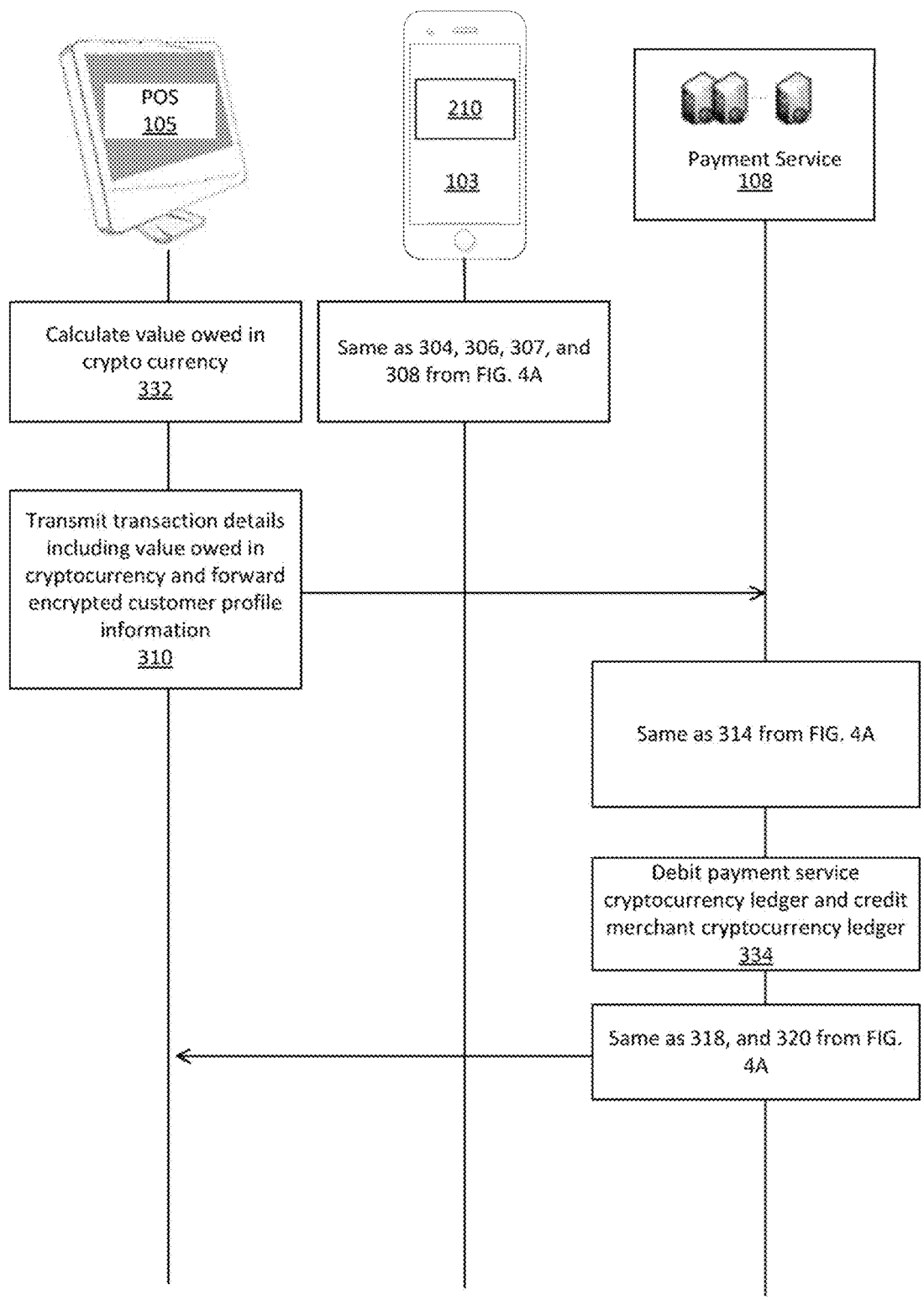
FIG. 4B illustrates an example method of paying a merchant using a virtual currency in accordance with some embodiments.

FIG. 4B illustrates an embodiment of the present technology wherein merchant 102 through POS device 105 wishes to be paid in cryptocurrency and customer 104 through device 103 desires to pay in cryptocurrency.

FIG. 4B is similar to FIG. 4A in many respects, except that the POS system 105 calculates a value owed in cryptocurrency (332). In some embodiments, POS system 105 might not calculate a value owned in cryptocurrency until it has learned that device 103 has indicated it wishes to pay in cryptocurrency.

POS device 105 can transmit (310) the transaction details including the value owed in cryptocurrency. Just as in FIG. 4A, payment service 108 can debit (314) cryptocurrency ledger 204 of customer profile 132 and credit cryptocurrency ledger 219 of payment service 108.

Payment service 108 can then debit (334) payment service 108 cryptocurrency ledger 219 and credit merchant profile 130 cryptocurrency ledger 207, and can complete the transaction as addressed with respect to steps 318 and 320 of FIG. 4A.

In FIG. 4B, the transaction is still conducted in multiple parts so as to increase the speed of the transaction. While it would be possible for customer 104 to pay merchant 102 in a direct cryptocurrency transfer, such transfer would require confirmation of the transaction on public blockchain 220, which can take too long for a typical merchant-customer transaction.

FIG. 5 illustrates an embodiment of the present technology wherein customer device 103 and POS device 105 communicate with payment service 108, and does not communicate directly with each other.

In FIG. 5 customer device selects (402) merchant using application 210, and receives an input of an alias (404). In some embodiments, customer device 103 can also browse a webpage of merchant 102 and facilitate selection of items for purchase from merchant. This information is sent to payment service 108. Payment service 108 can communicate (406) customer 104's alias to POS device 105 where it is displayed for selection by merchant 102 when merchant is ready to conduct a transaction with customer 104.

In some embodiments, the alias can be a machine-readable code, such as a QR code, that can be used to identify the customer. In such embodiments, the alias may also include a human comprehensible portion.

In some embodiments, mobile device can send a message to POS device over a Wide Area Network or through an intermediary. Such message can take any form, including a text message that identifies the customer via an alias, and declares a desire to pay using cryptocurrency. For example, payment service 108 may support tagging of messages in such a way that the message itself becomes an instruction to carry out a transaction as addressed in more detail below.

POS device 105 receives a selection (408) of customer 104's alias, and also receives (410) items for purchase and calculates a value owed in a currency. POS device 105 sends this transaction information to payment service 108, which transmits at least a portion of the transaction information to customer device 103.

After receipt of transaction information, customer device 103 presents (412) payment options, and receives a selection (414) of a cryptocurrency payment option and sends an instruction to payment merchant 102 using the selected payment option to payment service 108. In some embodiments customer device 103 may need to send authentication information or a PIN to conduct the transaction. In some embodiments, authentication is not sent to the payment service and is instead left to application 210 to authenticate a user to instruct that a payment be made.

Once payment service receives the instruction to pay merchant 102, payment service can complete the transaction in the same manner as described with respect to steps 312, 314, 316, 318, and 320 described with respect to FIG. 4 above.

As noted above, conducting transactions with an unknown party can increase a variety of risks, including risks of violating various laws. As such, while merchants 102 or users 150 may conduct transitions with a party identifying themselves with only an alias, payment service 108 reduces the risks associated with such transactions. Payment service 108 can require a customer profile 132 to be established before processing any transaction where a party wishes to only be identified by an alias. Creation of customer profile 132 can be subject to background checks, or other verifications of identity. For example, one or more government issued ID numbers may be required to create a customer profile that is usable with aliases. Since payment service 108 has verified the identity of those parties wishing to conduct transactions using an alias, while merchants 102 or users 150 can safely conduct such transactions.

While the figures and description provided herein may make reference to singular nouns, e.g., an account, a merchant, a POS device, a customer device, or a customer, it should be appreciated that such references are not limited to the singular form of such nouns. Rather such references will be appreciated by those of ordinary skill in the art to refer to one of a plurality of such singular nouns, e.g., one of a plurality of accounts, merchants, POS devices, customer devices, or customers, etc.

While in some embodiments, the present disclosure refers to crediting or debiting a ledger with a value. It will be appreciated that in some embodiments that the actual value that is credited or debited may actually be slightly greater or less than the stated value to account for transaction fees or exchange rates, etc.

While reference has been made to merchant 102 or POS device 105, persons of ordinary skill in the art will appreciate that merchant 102 can be easily substituted for another customer 103 where a first customer 103 could send currency to another customer 103. As such references to merchant 102 or POS device 105 receiving currency in a transaction should not be considered limited to such entities. Rather such entities are merely an illustrative embodiment and any type of entity can be substituted for merchant 102 or POS device 105 as the entity receiving currency in a transaction.

In some embodiments the merchants referred to herein may have a merchant profile 130 with payment service 108 as described above, or may be external to the payment service 108. When merchants are not registered with payment service 108, it can be assumed that these merchants desire to transact in the fiat currency of their jurisdiction. Customers registered with payment service 103 can pay in any currency associated with their account as described herein.

Figure 6:
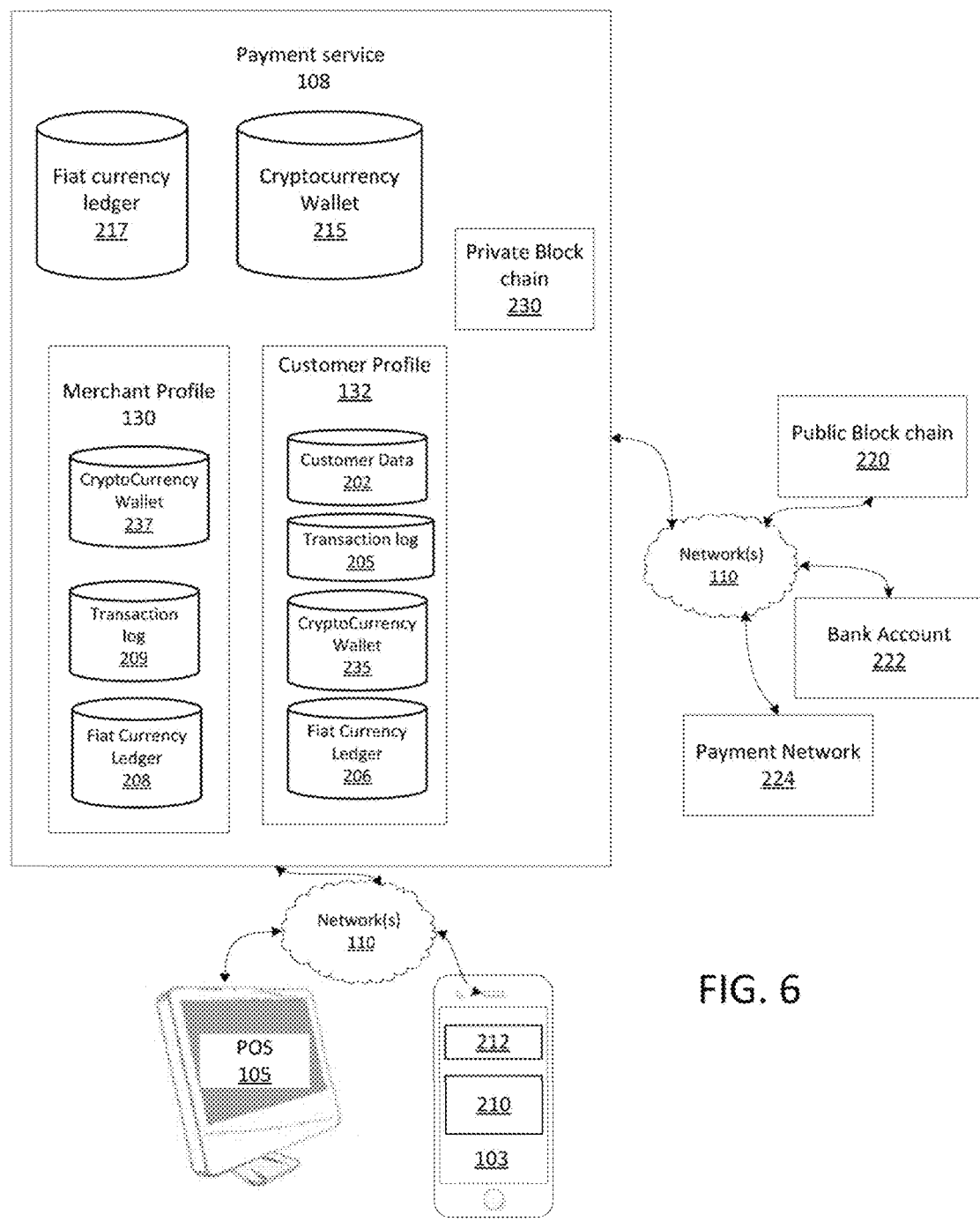
FIG. 6 illustrates and example payment service in accordance with some embodiments.

FIG. 6 illustrates an example system embodiment wherein payment service 108 includes private blockchain 230 for recording and validating cryptocurrency transactions. FIG. 6 is similar to FIG. 2 in most respects. However, the system illustrated in FIG. 6 does not include cryptocurrency ledger 219, customer 104's cryptocurrency ledger 204 has been replaced by customer 104's cryptocurrency wallet 235, merchant 102's cryptocurrency ledger 235 has been replaced by merchant 102's cryptocurrency wallet 237 and payment service 108 includes private blockchain 230.

Private blockchain 230 can function to record sender addresses, recipient addresses, public keys, values of cryptocurrency transferred, and can be used to verify ownership of cryptocurrency tokens to be transferred.

In some embodiments, payment service 108 can record transactions taking place within payment service 108 involving cryptocurrency until the number of transactions has exceeded a determined limit (limit could be a number of transactions, storage space allocation for a number of transactions, or any other limit, etc.). Once the limit has been reached payment service 108 can publish the transactions in private blockchain 230 to public blockchain 220 where miners can verify the transactions and record the transactions in blocks on public blockchain 220.

In some embodiments payment service 108 can participate as a miner at least for its transactions to be posed to public blockchain 220.

With specific reference to funding a cryptocurrency account in a system such as illustrated in FIG. 6, customer 104 may have a balance of cryptocurrency stored in third party digital wallet 212 on customer 104's computing device 103 unrelated to payment service 108 and customer 104 can transfer all or a portion of the balance of the cryptocurrency stored in third party digital wallet 212 to payment service 108 as is well known to those of skill in the art. Such a transaction requires customer 104 to transfer an amount of the virtual currency in a message signed by customer 104's private key to an address of cryptocurrency wallet 235 within payment service 108. Thereafter the transferred amount of cryptocurrency is within customer 104's cryptocurrency wallet 235 for use in later transactions. Note that in this transaction, the cryptocurrency remains in a wallet of customer 104 as opposed to a wallet of payment service 108.

Figure 7A:
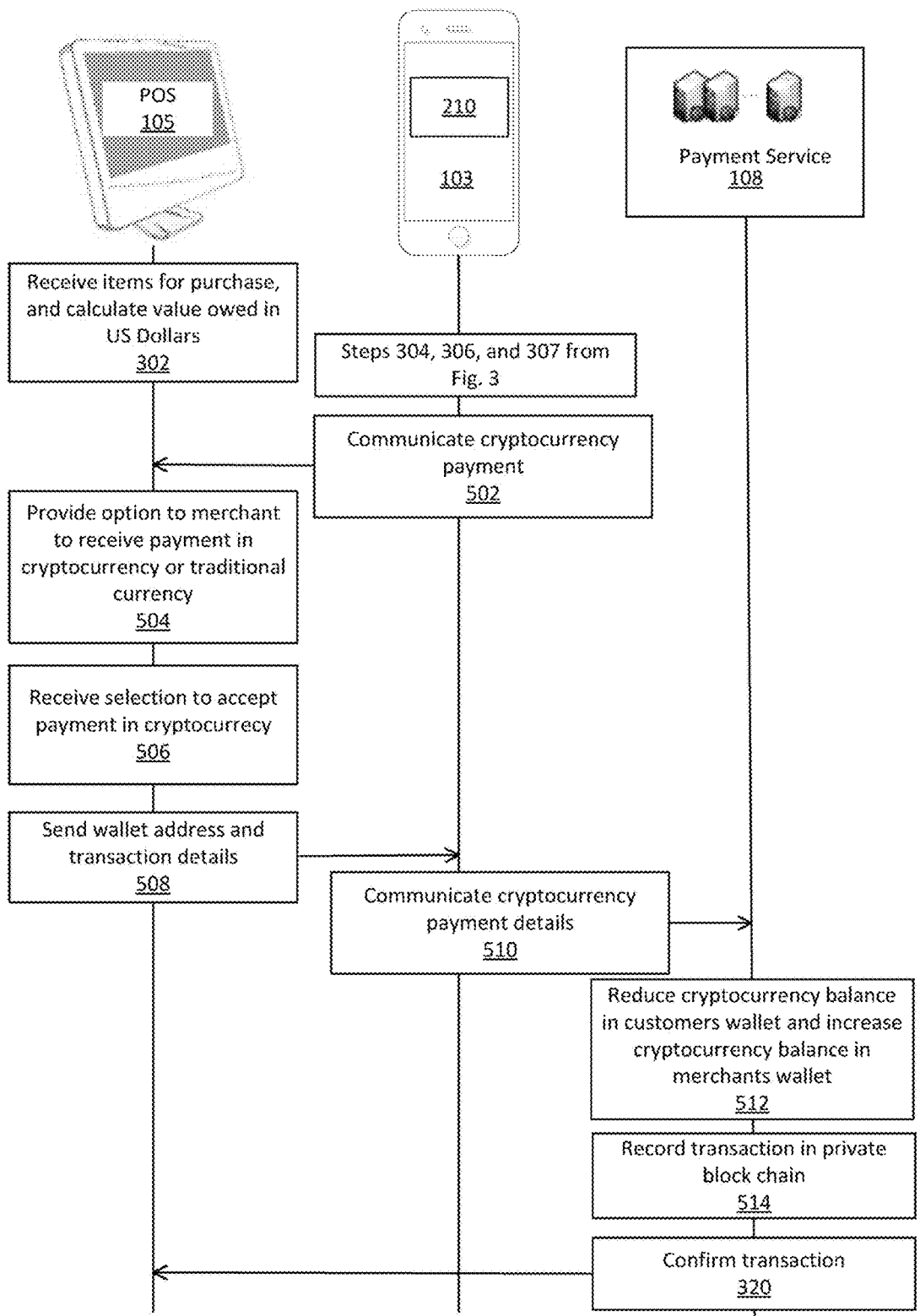
FIG. 7A illustrates an example method of paying a merchant using a virtual currency in accordance with some embodiments.

FIG. 7A illustrates an example method embodiment of conducting a cryptocurrency transaction mediated by payment service 108 as illustrated in FIG. 6 (with private blockchain). The method can begin by carrying out steps 302, 304, 306, and 307 from FIG. 5.

At step 502 customer device 103 communicates to POS device 105 a declaration that customer device 103 will pay in cryptocurrency. After receiving this message, POS device 105 can display 504 an option to merchant 102 whether they would like to receive payment in the cryptocurrency or in another currency such as a fiat currency. As addressed above, in some embodiments this option might not be displayed such as when merchant profile 130 includes a declared preference for how to handle such options.

When merchant 102 selects and POS device 105 receives the selection 506 to receive payment in cryptocurrency, POS device 105 can send 508 address of cryptocurrency wallet 237 and other transaction details such as value owed to customer device 103. Customer device 103 can then send 510 a message signed by its private key including its wallet 235 address, identify the cryptocurrency, and a value to be transferred to merchant wallet 237 to payment service 108.

Payment service 108 can complete the transaction by reducing 512 the cryptocurrency balance in customer 104's wallet 235 and increasing 512 cryptocurrency balance in merchant 102's wallet 237. This can be carried out in methods commonly known in cryptocurrency transactions.

In addition to recording the transaction in cryptocurrency wallets 235 and 237 the transaction can be recorded in private blockchain 230 and the transaction can be confirmed 320.

In some embodiments the transaction described in FIG. 7A can be performed in multiple parts. Instead of sending a message via payment service 108 from customer profile 132 cryptocurrency wallet 235 to merchant profile 130 cryptocurrency wallet 237, the transaction could also be modified so that both the customer and the merchant transact directly with payment service 108. For example, cryptocurrency wallet 235 could send a message to transfer cryptocurrency to cryptocurrency wallet 215 of payment service 108. Thereafter, cryptocurrency wallet can send a message to transfer cryptocurrency to cryptocurrency wallet 237 of merchant profile 130. Such a transaction can also have similar speed benefits. Since both merchant and customer are transacting directly with payment service 108, there is increased confidence that the transactions are legitimate, and therefore the transfers can be immediately registered, e.g. in near real time. These transactions can be recorded first to private blockchain 230 or directly to public blockchain 220. While public blockchain might still take minutes or an hour to record the transaction to the blockchain, merchant profile 130 and customer profile 132 can reflect the changed balance in advance of the recording on public blockchain 220. In such a transaction, payment service 108 bears the theoretical risk of a double spending of the cryptocurrency. The risk is negligent though since payment service 108 has visibility into cryptocurrency wallet 235 transactions.

In some embodiments one or more steps of the method illustrated in FIG. 7A might not be necessary. For example some communications with payment service 108 can be avoided and the transaction can be conducted as a more traditional peer-to-peer transaction common in cryptocurrency transfers.

The method illustrated in FIG. 7A has advantages over traditional cryptocurrency transactions since payment service 108 manages both wallets 235, 237, and private blockchain 230. As such the transaction does not need to wait for confirmation from public blockchain 220, which can take an unreasonable amount of time for many transactions. Instead payment service 108 can quickly verify that the transfer is legitimate and complete the transaction.

Figure 7B:
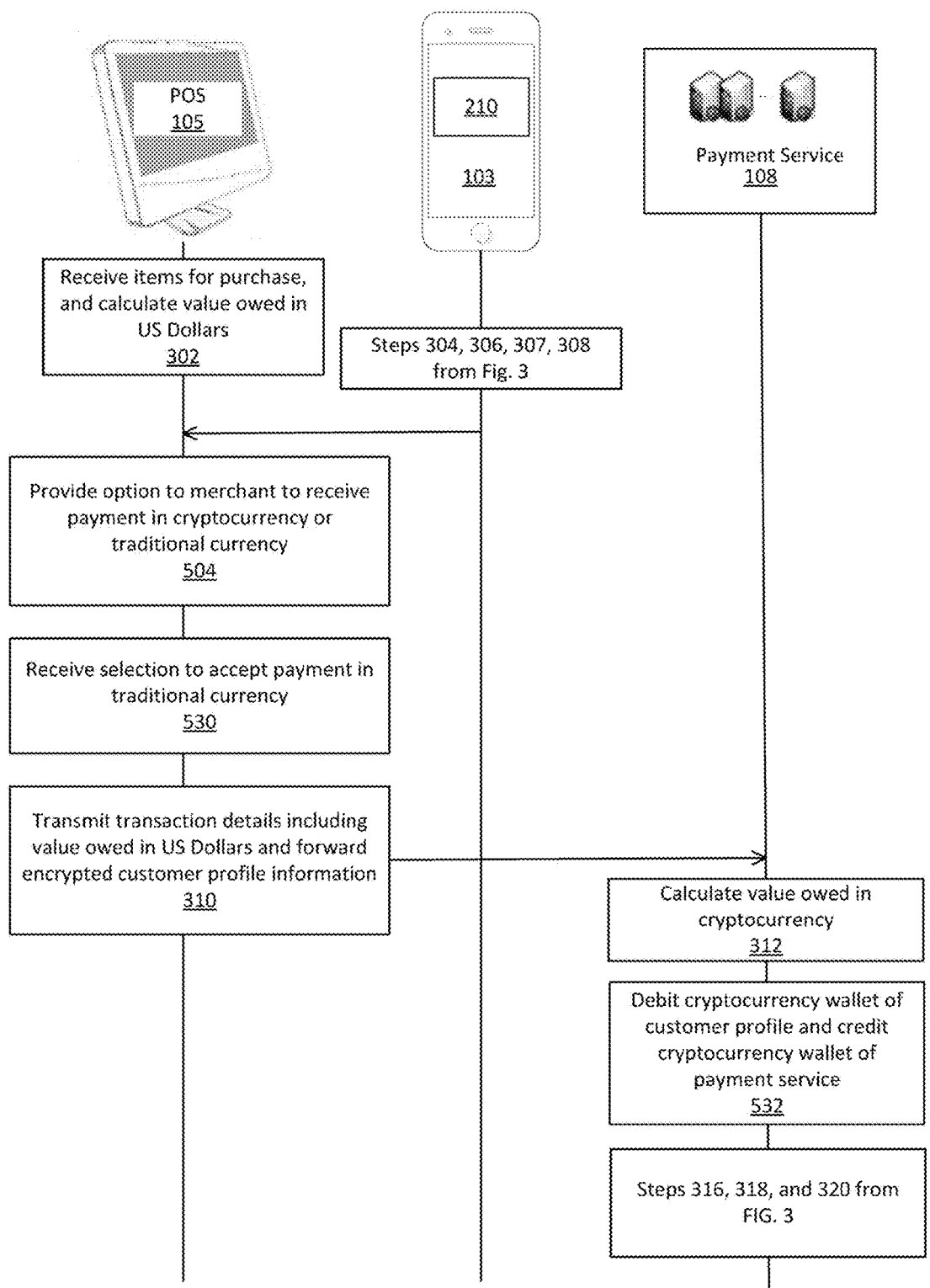
FIG. 7B illustrates an example method of paying a merchant using a virtual currency in accordance with some embodiments.

FIG. 7B illustrates an example method embodiment of conducting a cryptocurrency transaction mediated by payment service 108 as illustrated in FIG. 6 (with private blockchain). The method can begin by carrying out steps 302, 304, 306, 307 and 308 from FIG. 5.

After receiving message 308 (that customer 104 is paying by cryptocurrency and encrypted account information), POS device 105 can display 504 an option to merchant 102 whether they would like to receive payment in the cryptocurrency or in another currency such as a fiat currency. As addressed above, in some embodiments this option might not be displayed such as when merchant profile 130 includes a declared preference for how to handle such options.

When merchant 102 selects and POS device receives 530 selection of payment option to receive payment in a fiat currency POS device 105 can then proceed as in step 310 of FIG. 5, wherein POS device communicates a value owed in fiat currency and the encrypted payment information received from customer device 103 to payment service 108. Payment service 108 can calculate an amount owed in the cryptocurrency as in step 312 of FIG. 5. Payment service 108 can then conduct a cryptocurrency transaction between customer cryptocurrency wallet 235 and payment service cryptocurrency wallet 215 and record the transaction on private blockchain 230. Thereafter the method can complete in the same manner as described with respect to steps 316, 318, and 320 as described with respect to FIG. 5.

While the embodiments addressed above are primarily directed to transactions between a merchant and a customer, it will be appreciated that the principles addressed above are applicable to transactions between any two parties transferring currency, included transfers between peers, employers and employees, etc. As such, persons of ordinary skill in the art will recognize the parties, at a fundamental level, to be a transferring party and a receiving party.

In some embodiments, by virtue of having multiple currencies associated with customer profile 132, payment service can be configured to utilize the currency most favorable to the customer. For example, if a customer were to be in a foreign country and a merchant were to require payment in a currency for which the customer does not have an account balance, payment service can select which of the payment accounts that are associated with customer profile 132 that has the most favorable exchange rate for the customer.

FIGS. 8, 9, 10A and 10B illustrate example user interfaces of application 210 useful in transferring cryptocurrency into or out of payment service 108, managing, and spending cryptocurrency.

Figure 8:
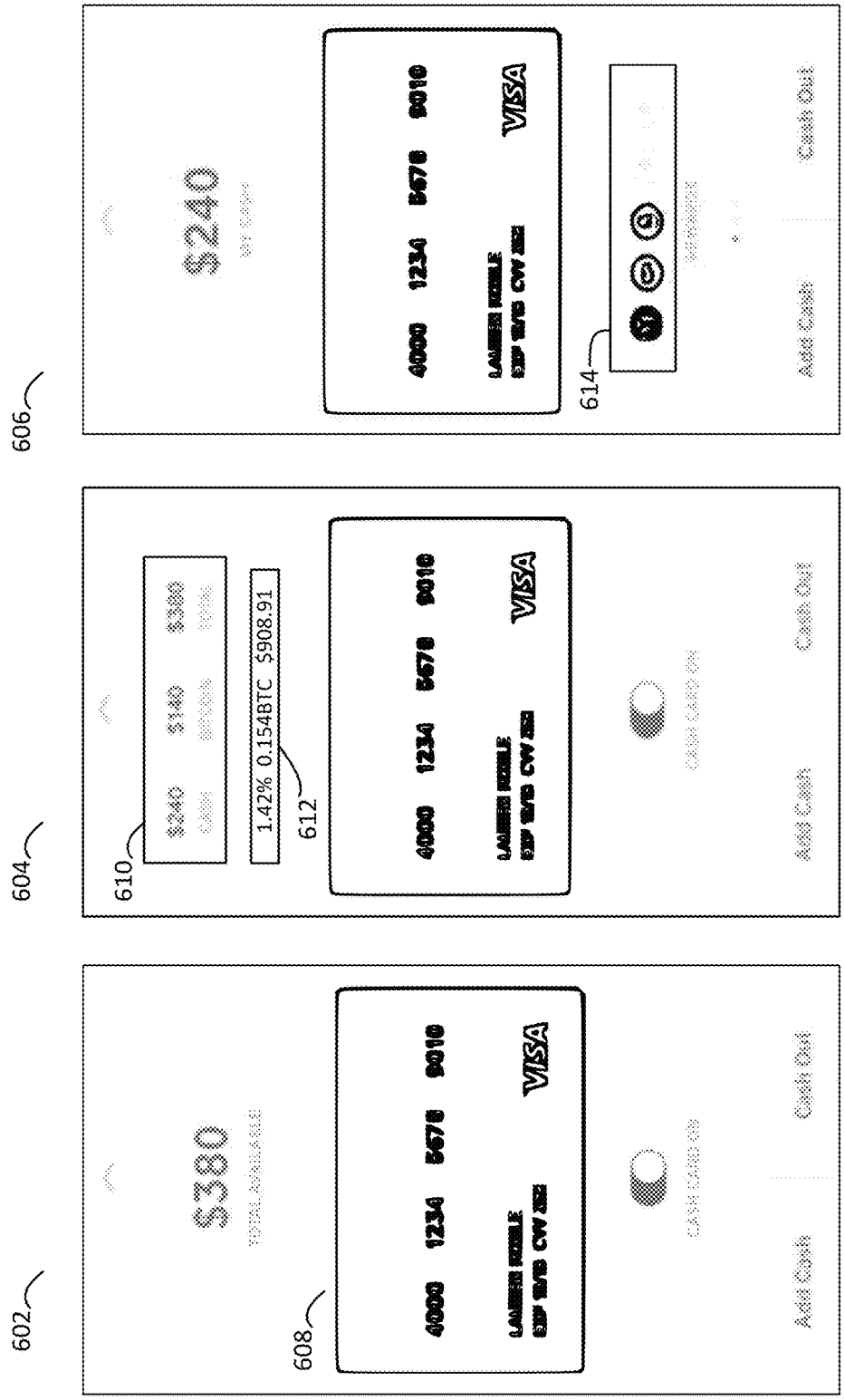
FIG. 8 illustrates example graphical user interfaces in accordance with some embodiments.

FIG. 8 illustrates several account overview pages 602, 604, 606. Page 602 illustrates a total amount available (i.e., $380) associated with customer profile 132. Page 604 illustrates a breakdown of separate accounts within payment service 108. Specifically page 604 illustrates account breakdown summary 610 showing that the $380 balance associated with customer profile is comprised of holdings of $240 USD, and $140 USD value of bitcoin. Page 604 also provides market details 612 of customer profile 132's holdings in bitcoin. Market details show a change in market value of bitcoin for the period (i.e. 1.2%), total holdings in bitcoin (customer profile 132 holds 0.015 bitcoin), and the value in USD of a bitcoin (i.e., $908.91). Page 614 illustrates a view of cash holdings as well as provides selectable icons 614 for selecting loyalty cards stored in association with customer profile 132.

All three views 602, 604, 606, illustrate payment card 608 associated with customer profile 132. In some embodiments card 608 is a virtual card that permits transactions using the virtual card number. In some embodiments, payment card 608 is an illustration of an actual card issued to customer 104 that is linked to customer profile 132.

FIG. 9 illustrates several views of a virtual currency wallet. View 620 illustrates a view of a bitcoin wallet showing the amount of bitcoin stored in the wallet. View 622 illustrates a selectable user interface element to "add a bitcoin wallet" to customer profile 132. View 624 illustrates a view that follows a selection of the "add bitcoin wallet" user interface element in view 622. In view 624 customer 104 can input an address of an external wallet that contains bitcoin so that bitcoin can be transferred to/from either cryptocurrency wallet 215 (FIG. 2 and FIG. 6) or cryptocurrency wallet 235 (FIG. 6) (depending on system configuration, see e.g., FIG. 2 and FIG. 6).

Figure 10A:
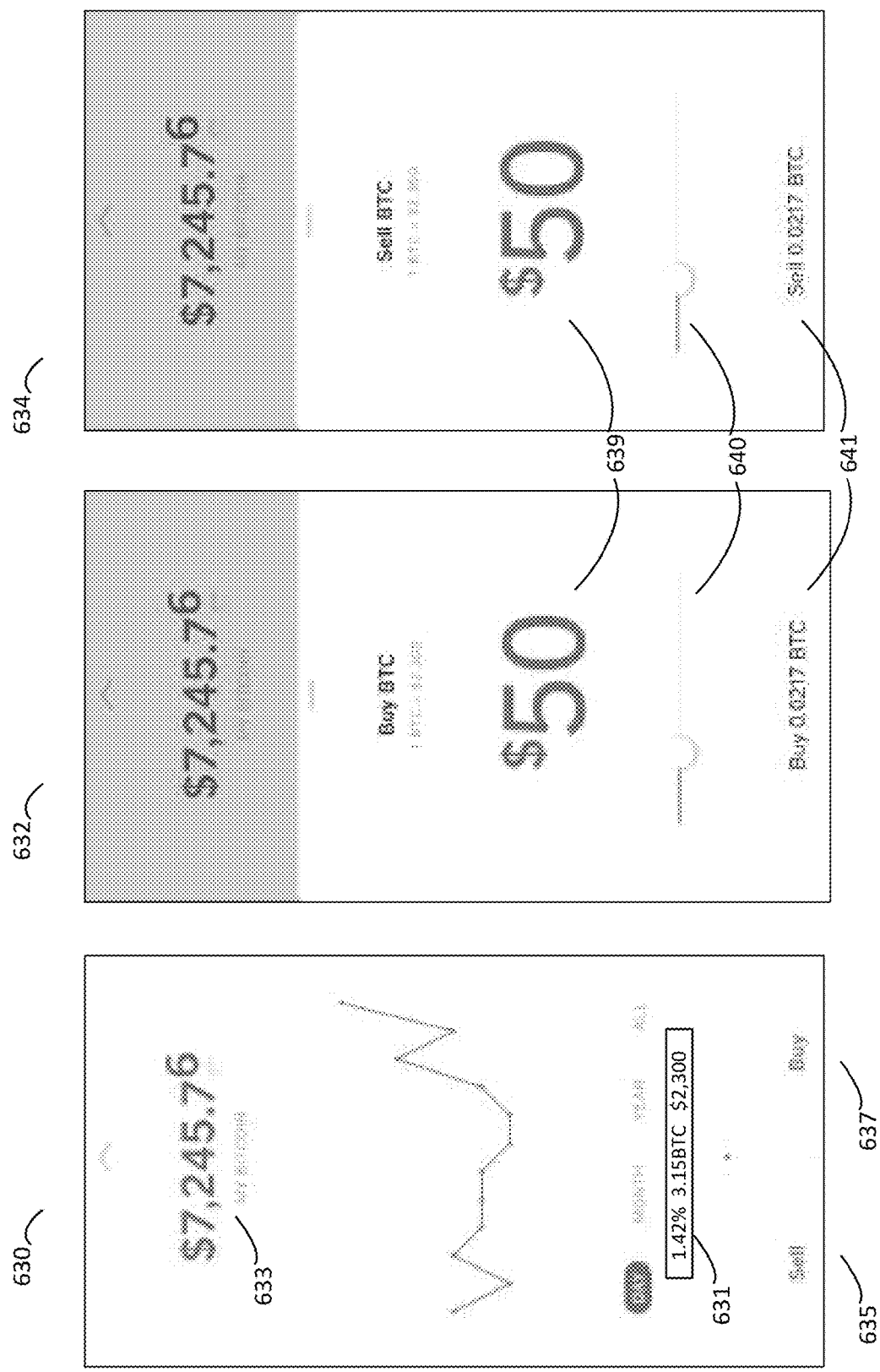
FIG. 10A and FIG. 10B and FIG. 10C illustrates example graphical user interfaces in accordance with some embodiments.
Figure 10B:
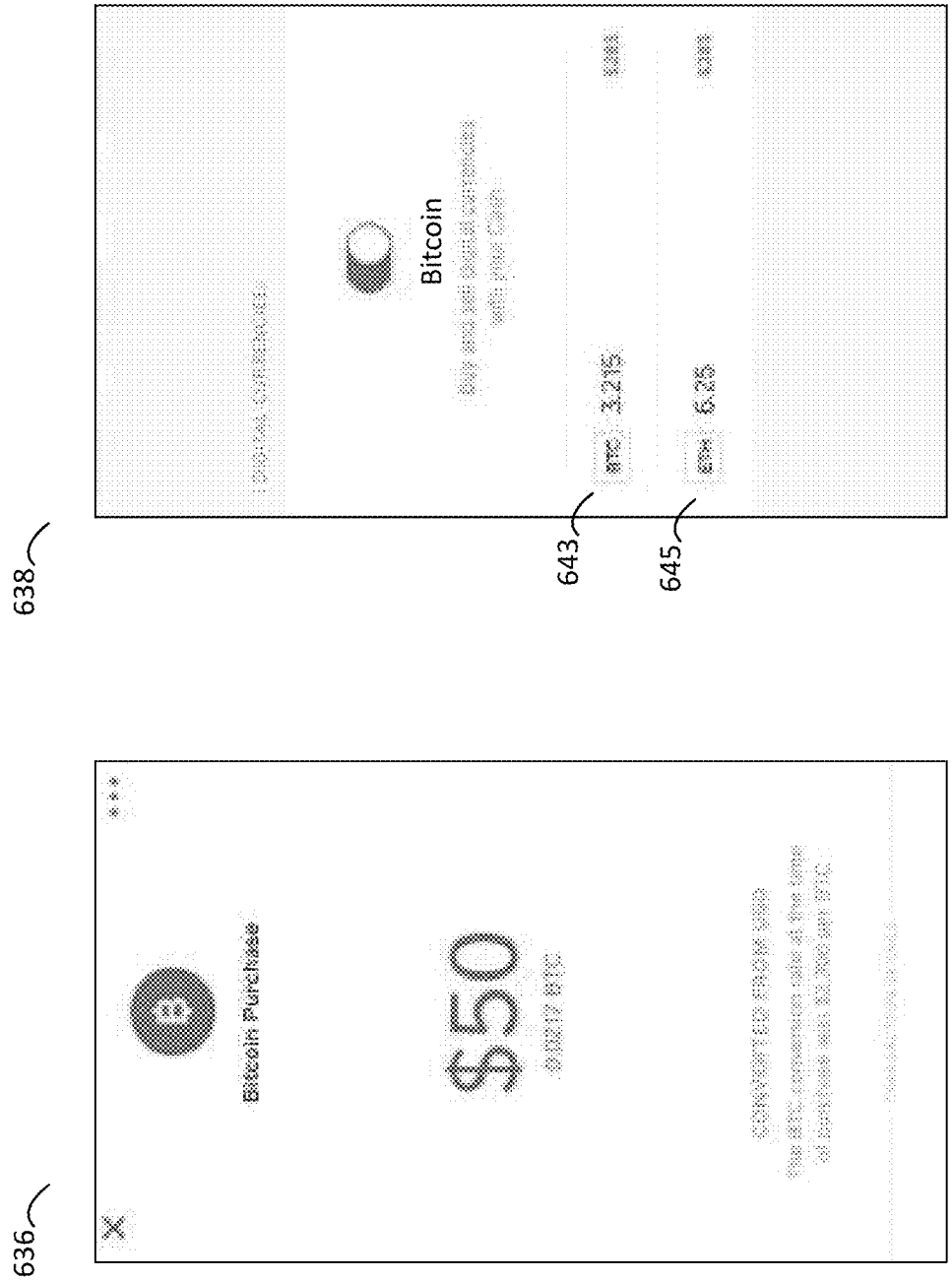
Figure 10C:
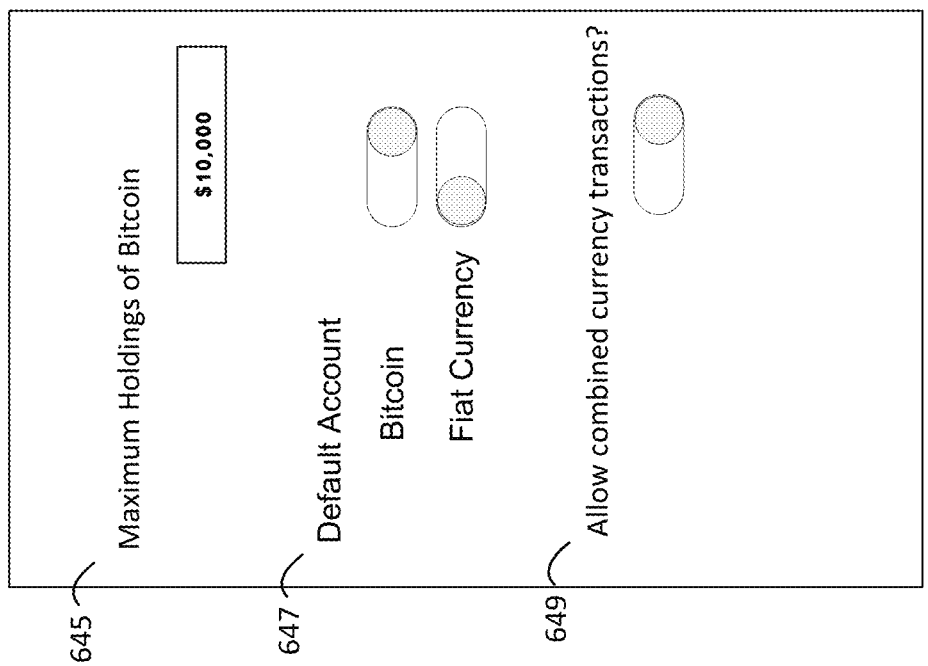

FIG. 10A and FIG. 10B illustrate example virtual currency investment screens. For example view 630 illustrates a graph of bitcoin pricing changes throughout a day along with a current value in USD 633 of customer 104's holding in bitcoin, and bitcoin data 631 showing the percentage change in price for bitcoin over the period shown (1.42% for the day), currency number of bitcoins held by customer 104 (3.15), and the value in USD of each bitcoin ($2,300). Additionally, view 630 provides selectable options to buy 637 or sell 635 bitcoin.

Views 632 and 634 result from a respective selection of buy 637 and sell 635 options in view 630. View 632 provides a user interface for buying bitcoin, and view 634 provides a user interface for selling bitcoin. Both views 632 and 634 show a value in USD 639 of the bitcoin to be bought or sold, and show the number of bitcoins 641 to be bought or sold. The value of bitcoins to be bought or sold can be adjusted using slider 640. In some embodiments, the maximum value of slider can be configured to be the maximum funds in another account (e.g., fiat currency account) associated with the user account of the payment system.

View 636 illustrates a screen showing confirmation of a successful purchase of bitcoin using $50 USD to acquire 0.0217 bitcoin.

View 638 illustrates a screen showing multiple cryptocurrency wallets. Customer profile 132 is associated with holdings of bitcoin 643 and holdings of ether 645. Either holding can be selected and detailed views regarding those holdings including research, and buying and selling these cryptocurrencies will be available. While many of the user interface screens addressed with respect to FIGS. 8, 9, 10A, and 10B have illustrated actions or research with respect to bitcoin, it will be appreciated that similar screens are also provided for other cryptocurrencies such as ether.

In some embodiments holdings in cryptocurrencies or other non-fiat currencies can be subject to customer 104 defined rules as illustrated in FIG. 10C. For example, rules can designate a maximum holding 645 in any non-fiat currency, and when any holding reaches the maximum, payment service 108 can automatically sell a portion of those holdings to keep the holdings below the maximum stated amount. Similarly rules can be set to keep holdings of specified non-fiat currencies above a minimum amount of holdings.

Rules can be based on any definable factor including maximum, minimums, price of conversion, change in value, etc. Rules can also be set to meet goals such as "when bitcoin holdings equal $100 USD donate holdings to XYZ charity."

When customer 104 has more than one currency ledger associated with customer profile 132, application 210 can also include options to designate a currency as the default currency for transactions 647.

In some embodiments application 210 can also provide an option to allow transactions to be funded by combining different currencies 649, for example if the default account was underfunded. In some embodiments, the combined currency could include funds from an account external to payment service 108 such as bank account 222, payment network 224, or external cryptocurrency wallet.

In some embodiments, one or more of the options illustrated in FIG. 10C can be automatically selected or adjusted by payment service through communication with application 210. For example, payment service can observe that a particular currency is preferred, or most recently used and make this a default account. In some embodiments, payment service might set limits on the maximum holdings of bitcoin based on the volume of transactions associated with customer profile 132 or based on a percentage of total payment service 108 holdings in cryptocurrency wallet 215.

In addition to rules that specify when accounts of customer profile 132 should buy into or out of a cryptocurrency, payment service 108 can also employ heuristics or machine learning techniques to predict when a conversion of currencies will be needed, and can preemptively make such a conversion.

For example bitcoins can be converted into another currency prior to the transaction based on the relationship between the customer and the merchant. By looking at the customer 104's purchase behavior, customer 104's payment instrument of choice, and/or location (e.g., geolocation, geofence, beacons, etc.), the system can predict sale of the bitcoin at public blockchain 220 or obtain the bitcoin value from the local wallet. This will speed up the bitcoin transactions. For example, in some embodiments, payment service 108 can monitor location of client device 103 to determine that it is within merchant 102's store, and that merchant 102 does not accept cryptocurrency. Payment service could preemptively cash out a portion of cryptocurrency so that customer 104 can pay merchant 102 directly with fiat currency.

In some embodiments, the transaction can appear to customer 102 as if they paid with cryptocurrency as addressed above, even though the transaction actually occurred in two parts (conversion of cryptocurrency to fiat currency, and payment in fiat currency).

While above embodiments have been discussed with respect to buying and selling a cryptocurrency with or to cash, it should be appreciated that cryptocurrency can also be converted to/from other currencies including securities.

As will be appreciated by those of skill in the art, in some embodiments it may be possible for payment service 108 to accrue a large amount of cryptocurrency in cryptocurrency wallet 215. In some embodiments, large amounts of cryptocurrency can create a risk for payment service 108 due to volatility in cryptocurrency value and other factors. Accordingly, payment service 108 can include a risk threshold calculation and manage its holdings according to such threshold. When the amount of a cryptocurrency (or other non-fiat currency) triggers a risk threshold, in some embodiments, payment service 108 can automatically cash out of its positions in the non-fiat currency. In some embodiments, payment service can slow its processing of transactions in the non-fiat currency as well. This may give more time for offsetting transactions that reduce payments service 108's holdings in the non-fiat currency. By the payment service 108 only cashing out when a risk threshold is reached, the payment service 108 minimizes its demands on the processing and bandwidth requirements of external systems.

In some embodiments, payment service 108 may support tagging of messages in such a way that the message itself becomes an instruction to carry out a transaction. As used here, the term "tagging" refers to a marking of an alphanumeric character (or a string of alphanumeric characters (e.g., a message or statement) to identify it (i.e., the character or string) for treatment in a specified way. Briefly described, tagging enables a sender, who desires to send virtual or fiat currency to a recipient, to trigger a currency transfer by specifying, in any communication message, an amount and a recipient using one or more inputs having a particular syntax. The syntax includes a currency indicator prefixing one or more alphanumeric characters. The currency indicator operates as the tagging mechanism that indicates to a computer system to treat the inputs as a request from the sender to transfer currency, where detection of the syntax (which includes one or more alphanumeric characters tagged by a currency indicator) triggers a transfer of the currency. The currency indicator can correspond to various currencies, e.g., dollar ($), euro (€), pound (£), rupee ( ) yuan (¥), bitcoin (BTC), Ether (ETH), etc.

The tagging technology provides efficient execution of financial transactions (e.g., payment transfers) by enabling a sender to trigger a currency transfer through the use of the syntax in any communication message. In particular, the sender can specify, in a communication message, an amount of currency to transfer by including an input having the syntax, where the input can include the monetary indicator and one or more numeric characters (e.g., $10). In some instances, the sender can also specify, in the communication message, the recipient to whom the sender intends to send the money by including another input having the syntax. The input can include the currency indicator and one or more alphabetic and/or numeric characters (e.g., $alex or $alex123).

While a variety of transaction have been disclosed herein including merchant-customer transactions, user-user transactions, direct transfers between a first party and a second party, and indirect transfers wherein a first party transfers to payment service 108, and then payment service 108 transfers to a second party, it should be appreciated that any combination of parties, whether merchants, customers, users can participate in direct or indirect transfers addressed herein.

Figure 11:
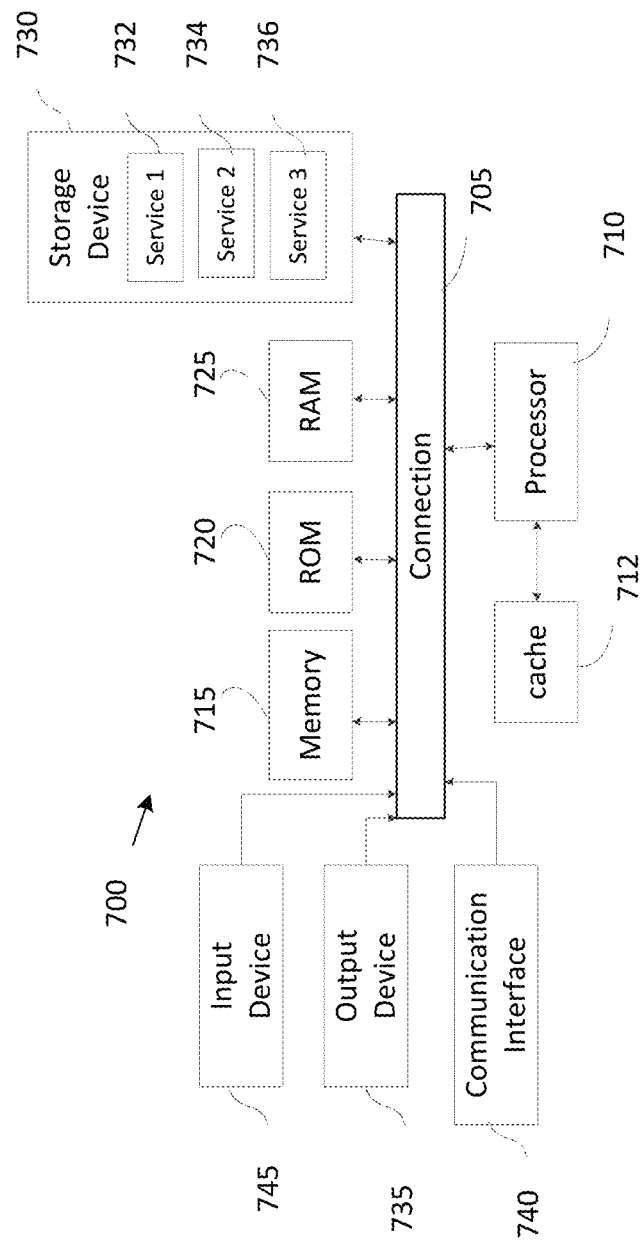
FIG. 11 shows an example of a system for implementing certain aspects of the present technology.

FIG. 11 shows an example of computing system 500 in which the components of the system are in communication with each other using connection 705. Computing system 700 can be for example a computing system of payment service 108, POS device 105, and/or customer device 103. While these devices have some components in common, such as those illustrated in computing system 500, it should be appreciated that each of payment service 108, POS device 105, and/or customer device 103 are specialized devices configured for their specific purposes. Connection 705 can be a physical connection via a bus, or a direct connection into processor 710, such as in a chipset architecture. Connection 705 can also be a virtual connection, networked connection, or logical connection. For example, when the computing system 700 is a payment service 108, the cryptocurrency transactions between a customer and a merchant are centrally managed, aggregated and traded at computer generated time intervals and as per user preferences.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory or transitory computer-readable medium.

In some embodiments the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of settling a transaction, comprising:
    receiving, by a payment service, a request for payment associated with the transaction between a first user and a second user, wherein the request specifies a payment amount in a fiat currency;
    identifying, by the payment service, an indication that the first user intends to satisfy the request for payment using a cryptocurrency;
    initiating, by the payment service, a first transfer of a value corresponding to the payment amount in the cryptocurrency from a first balance of the first user to one or more service balances of the payment service, wherein the first balance is stored in one or more data structures maintained by the payment service; and
    initiating, by the payment service, a second transfer of a value corresponding to the payment amount in the fiat currency from the one or more service balances of the payment service to a second balance of the second user, wherein the second balance is stored in the one or more data structures maintained by the payment service.

2. The method of claim 1, wherein the identifying the indication that the first user intends to satisfy the request for payment using a cryptocurrency comprises:
    sending, to a computing device associated with the first user, information to display the request for payment with different payment options, wherein the payment options include a fiat currency payment option and a cryptocurrency payment option; and
    receiving, from the computing device associated with the first user, input selecting the cryptocurrency payment option.

3. The method of claim 2, wherein the information to display the request for payment with different payment options includes information specifying an exchange rate between the cryptocurrency and the fiat currency.

4. The method of claim 3, wherein the first user has multiple payment accounts with the payment service, each of the payment accounts being associated with a different currency, and wherein the identifying the indication that the first user intends to satisfy the request for payment using a cryptocurrency comprises:
    determining exchange rates between each of the different currencies and the fiat currency, wherein the determined exchange rates comprise the exchange rate between the cryptocurrency and the fiat currency;
    determining that the exchange rate between the cryptocurrency and the fiat currency is most favorable for the first user.

5. The method of claim 1, wherein the identifying the indication that the first user intends to satisfy the request for payment using a cryptocurrency comprises:
    receiving information regarding a payment card linked to the first balance, wherein the payment card is registered with the payment service; and
    retrieving, based on the information regarding the payment card, preference information of the first user.

6. The method of claim 5, wherein the payment card is linked to multiple payment accounts of the first user, and wherein the preference information of the first user is stored in a profile for the first user.

7. The method of claim 1, wherein the initiating a first transfer of a value corresponding to the payment account in the cryptocurrency from a first balance of the first user to one or more service balances of the payment service comprises:
    debiting the value in the cryptocurrency from the first balance; and
    crediting the value in the cryptocurrency to one or more of the service balances.

8. The method of claim 1, wherein the first balance is associated with a third-party cryptocurrency wallet owned by the first user, and wherein the initiating a first transfer of a value corresponding to the payment account in the cryptocurrency from a first balance of the first user to one or more service balances of the payment service comprises:
    initiating a transfer of the value in the cryptocurrency from the third-party cryptocurrency wallet to a cryptocurrency wallet of the payment service by recording the transfer on a blockchain associated with the cryptocurrency.

9. The method of claim 8, wherein the second transfer of the value in the fiat currency from the one or more service balances of the payment service to the second balance of the second user is only initiated after the transfer has been recorded on the blockchain.

10. The method of claim 1, wherein the request for payment comprises:
    a first identifier corresponding to the first user; and
    a second identifier corresponding to the second user.

11. The method of claim 10, further comprising:
    sending, to a computing device associated with the second user, a report associated with the transaction, wherein the report specifies the first identifier and an amount paid as the value in the fiat currency without disclosing that the payment was made in the cryptocurrency.

12. A method of settling a transaction, comprising:
    receiving, by a payment service, a request for payment associated with the transaction between a first user and a second user, wherein the request specifies a payment amount in a fiat currency;
    identifying, by the payment service, an indication that the first user intends to satisfy the request for payment using the fiat currency and the second user intends to receive the payment in a cryptocurrency;
    initiating, by the payment service, a first transfer of a value corresponding to the payment amount in the fiat currency from a first balance of the first user to one or more service balances of the payment service, wherein the first balance is stored in one or more data structures maintained by the payment service; and initiating, by the payment service, a second transfer of a value corresponding to the payment amount in the cryptocurrency from the one or more service balances of the payment service to a second balance of the second user, wherein the second balance is stored in the one or more data structures maintained by the payment service.

13. The method of claim 12, wherein the identifying the indication that the first user intends to satisfy the request for payment using the fiat currency comprises:

sending, to a computing device associated with the first user, information to display the request for payment with different payment options, wherein the payment options include a fiat currency payment option and a cryptocurrency payment option; and receiving, from the computing device associated with the first user, input selecting the fiat currency payment option.

14. The method of claim 13, wherein the information to display the request for payment with different payment options includes information specifying an exchange rate between the cryptocurrency and the fiat currency.

15. The method of claim 12, wherein the initiating a second transfer of a value corresponding to the payment account in the cryptocurrency from the one or more service balances of the payment service to a second balance of the second user comprises:

debiting the value in the cryptocurrency from one or more of the service balances; and crediting the value in the cryptocurrency to the second balance.

16. The method of claim 12, wherein the second balance is associated with a third-party cryptocurrency wallet owned by the second user, and wherein initiating a second transfer of a value corresponding to the payment account in the cryptocurrency from the one or more service balances of the payment service to a second balance of the second user comprises:

initiating a transfer of the value in the cryptocurrency from a cryptocurrency wallet of the payment service to the third-party cryptocurrency wallet by recording the transfer on a blockchain associated with the cryptocurrency.

17. The method of claim 12, wherein the request for payment comprises:

a first identifier corresponding to the first user; and
a second identifier corresponding to the second user.

18. The method of claim 17, further comprising:

sending, to a computing device associated with the first user, a report associated with the transaction, wherein the report specifies the second identifier and an amount paid as the value in the fiat currency without disclosing that the payment was made in the cryptocurrency.

* * * * *